(12) United States Patent
Ramanathan et al.

(10) Patent No.: US 10,262,321 B1
(45) Date of Patent: Apr. 16, 2019

(54) DIGITAL COIN, DIGITAL WALLET, AND MODEL OF TRANSACTION

(71) Applicants: Ramanathan Ramanathan, Bellevue, WA (US); Anirudh Ramanathan, Bellevue, WA (US)

(72) Inventors: Ramanathan Ramanathan, Bellevue, WA (US); Anirudh Ramanathan, Bellevue, WA (US)

( * ) Notice: Subject to any disclaimer, the term of this patent is extended or adjusted under 35 U.S.C. 154(b) by 531 days.

(21) Appl. No.: 14/788,585

(22) Filed: Jun. 30, 2015

Related U.S. Application Data

(60) Provisional application No. 62/024,530, filed on Jul. 15, 2014.

(51) Int. Cl.
*G06Q 20/40* (2012.01)
*G06Q 20/36* (2012.01)
*G06Q 20/06* (2012.01)
*G06Q 20/38* (2012.01)

(52) U.S. Cl.
CPC ....... *G06Q 20/3678* (2013.01); *G06Q 20/065* (2013.01); *G06Q 20/3829* (2013.01); *G06Q 2220/00* (2013.01)

(58) Field of Classification Search
CPC .................................................. G06Q 20/065
USPC .......................................................... 705/69
See application file for complete search history.

(56) References Cited

U.S. PATENT DOCUMENTS

| | | | |
|---|---|---|---|
| 2008/0262969 A1* | 10/2008 | Samid | G06Q 20/04 705/64 |
| 2015/0149336 A1* | 5/2015 | Haggerty | G06Q 20/425 705/35 |
| 2015/0220928 A1* | 8/2015 | Allen | G06O 20/0655 705/67 |

* cited by examiner

*Primary Examiner* — Cho Kwong
(74) *Attorney, Agent, or Firm* — Lee & Hayes, P.C.

(57) ABSTRACT

Embodiments of the present disclosure are directed to, among other things, methods, systems, and computer program instructions related to building and managing secure digital wallets, a general ledger, and a transaction structure to securely and anonymously transfer digital coins from one wallet in a computing device to another wallet in the same device or another computing device in which both computing devices are connected via Internet or any other network medium and protocols.

19 Claims, 22 Drawing Sheets

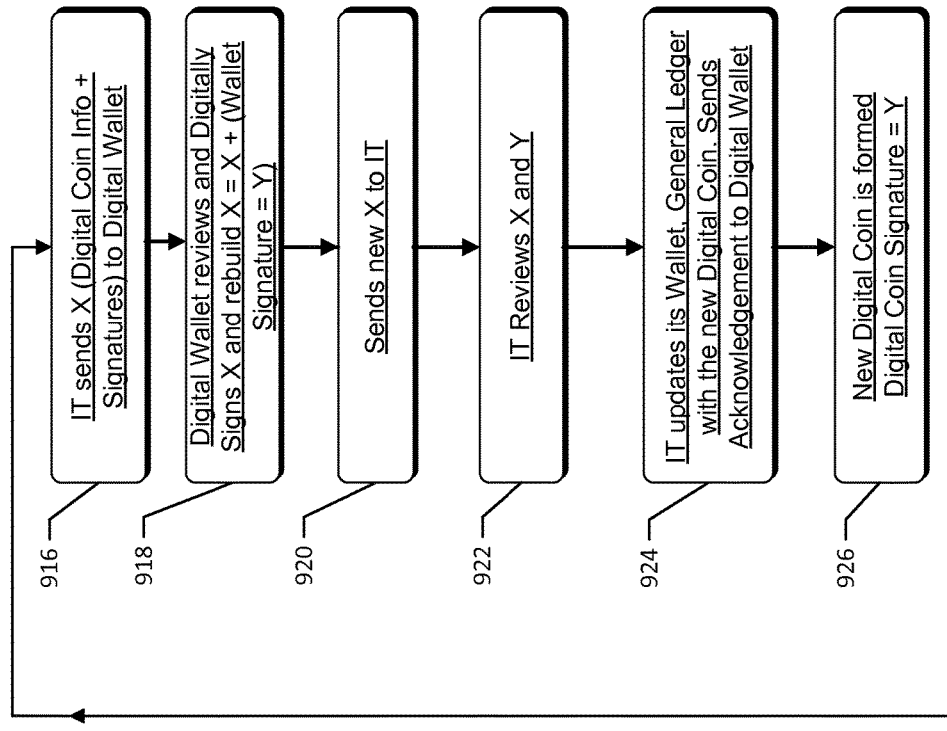
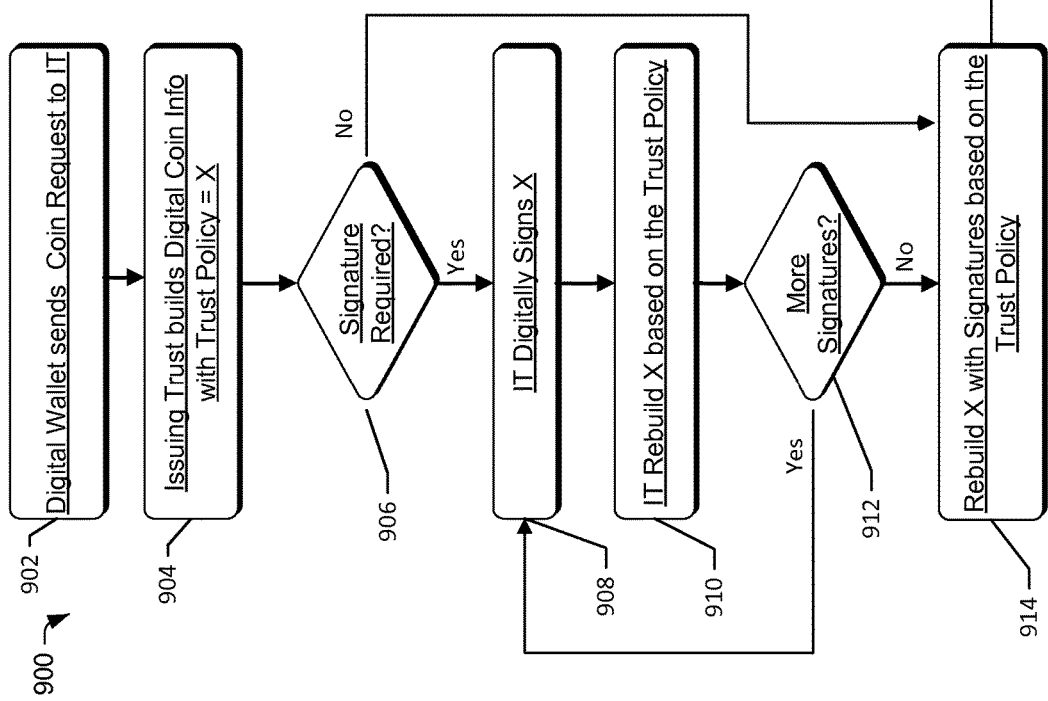
Fig. 9a

DIGITAL COIN, DIGITAL WALLET, AND MODEL OF TRANSACTION

RELATED APPLICATIONS

This U.S. patent application claims priority to provisional U.S. patent application No. 62/024,530, entitled "A new digital coin, new digital wallet and a new model of transaction," and filed on Jul. 15, 2014, the entirety of which is incorporated herein by reference.

BACKGROUND

Electronic money transactions are getting more prevalent and traditional payment methods such as cash, and money orders are slowly devolving into obscurity. This gradual change brings to light an important issue. The anonymity associated with cash transactions are lost when using electronic payment methods. Any payment amount, however minuscule it may be, is tracked and recorded when electronic payment methods are used. In a way this change is good as it provides transparency in regards to monetary transactions. On the other hand it challenges the privacy of an individual. Furthermore, cash transactions are instantaneous. While electronic transactions are not instantaneous even with recent improvements.

Today Crypto currencies (a.k.a Digital Currency/Math Based Currency) are prevalent and growing. The most successful crypto-currency is Bitcoin which is accepted by many vendors as alternate payment method to traditional currencies. It is a decentralized, anonymous electronic currency that first came into existence in 2009. You can use this crypto coin to buy produce at a farmers market, security services from major internet companies, as well as drugs and weapons from your favorite online black market. The list of Bitcoin vendors is growing every day. Very recently several merchants have announced their support for the cryptocurrency.

Most of the crypto currencies, including Bitcoin, are not regulated; no single group holds power and there is no centralized trust. In fact, the main objective of Bitcoin is to get away from centralized trust. The value of Bitcoin is changing frequently and it does not adhere to rules of a physical currency. It is traded like a stock within a jurisdiction. If an individual doesn't transact very quickly, the transaction itself will have a different value than originally established. If Bitcoin is viewed as a money order or a check, then the money order itself should not have its own value other than its cash value. In addition, since Bitcoin is based on the distributed trust, it depends on the individuals and their computational ability to validate the transaction and avoid double spending. Bitcoin requires a 10 minute window to verify the trust, and validate the transaction. This extended validation window is not instantaneous and is in fact quite dangerous. The unpredictable and uncontrollable aspects of crypto currencies may introduce another economic collapse similar to the great recession. An economic collapse triggered by the instability of crypto-currencies will be much more consequential that the economic recession in 2008.

SUMMARY

Currently, there is no digital currency that can be regulated and adhere to the policies of the jurisdiction in which the currency is in circulation while maintaining a standard of anonymity and a structure of decentralization. Described herein is a digital currency that adhere to the principles of physical cash. The digital currency in this model may represent a digital financial instrument that also behaves like a physical currency. This model can be extended to support other financial instruments like checks, cashier's checks, demand drafts, credit cards, and/or cash/debit cards.

Embodiments of the present disclosure are directed to, among other things, methods, systems, and computer program instructions related to building and managing secure digital wallets, a general ledger, and a transaction structure to securely and anonymously transfer digital coins from one wallet in a computing device to another wallet in the same device or in another computing device communicatively coupled to the sending computing device via Internet or any other network medium or network protocols.

The digital coin described herein behaves like physical cash in that it is stable, anonymous, and can be regulated. A trusted digital wallet is also described that can hold the digital coin securely and anonymously. In addition, the digital wallet can be implemented in any device, including mobile devices. A verifiable general ledger model is described in which a transaction can be documented without revealing the true identities of the payer and payee, the amount of the money transferred, and other details of the transaction. The model of transaction allows a payer to pay cash to a certain payee electronically in a secure fashion while adhering to the rules of the cash and cash payment, including payer/payee privacy, anonymity of the transaction, and so on.

In some embodiments, a process of receiving a digital coin includes receiving an identifier of a first digital coin, identifying an issuing trust, sending the identifier of the first digital coin to the issuing trust, and receiving, from the issuing trust, a second digital coin that is equal in value to the first digital coin.

In some embodiments, a process of updating a general ledger includes receiving an instruction to update a general ledger; and updating the general ledger by creating a record for a digital coin, the record including an operator, information associated with the digital coin, and a timestamp.

The techniques and systems described herein also avoid problems such as double spending. In combination with the digital wallet and transaction models, the described digital coin is trust worthy and can be widely used like physical cash. This model describes the protocol of coin creation, coin structures, wallets, wallet authentication, issuing and root trusts, trust and authentication models, secure execution of wallets, managing transactions, general ledgers, avoiding and detecting fraud, dispute resolution, returns and refunds, and with protocol for coin transactions along with many details. This model additionally describes method for sending coins securely via e-mail, text and other means.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

FIG. 9a is a representative flow diagram of the Digital Coin Signature process.

DETAILED DESCRIPTION

Figure 1:
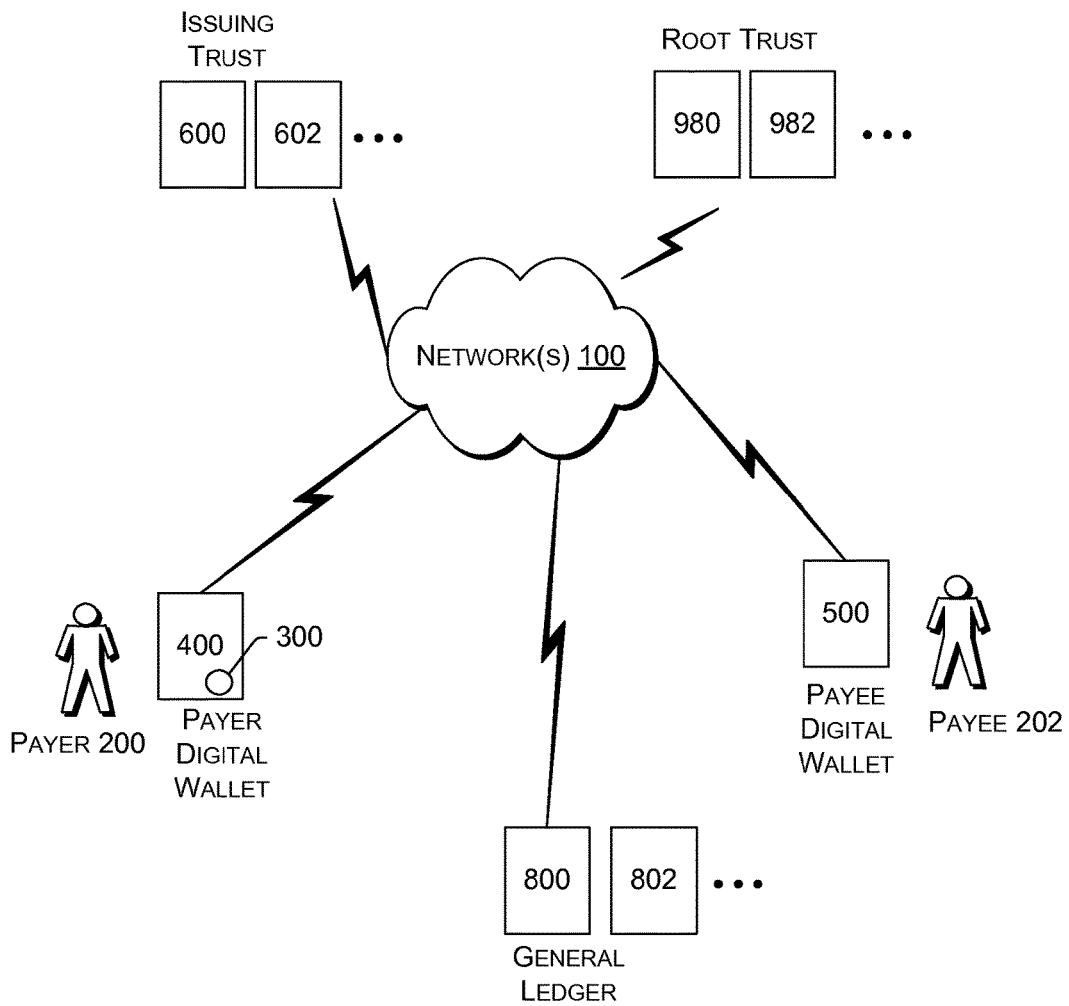
FIG. 1 illustrates an example architecture/environment where in which various components interact with each other to transfer money from one entity to another entity.

Embodiments of the present disclosure are directed to, among other things, methods, systems, and computer program instructions related to building and managing secure digital wallets, a general ledger, and a transaction structure to securely and anonymously transfer digital coins from one wallet in a computing device to another wallet in the same device or another computing device in which both computing devices are connected via Internet or any other network medium and protocols.

Issuing Trust (also referred to as: IT, Issuing Authority, IA, or Financial Institution) is a trusted service that has the authority to issue new digital coins, transfer coins, and conduct any other operations on the coin. In addition, the Issuing Trust has authority to manage Digital Wallets, Digital Coins, and the General Ledger. The Issuing Trust may be any company, bank, individual, an escrow, a money manager, and in theory any entity. The Issuing Trust, as described herein, may be represented by one or more computer systems, servers, devices, software, databases, networks, protocols, and/or applications that provide the services of the Issuing Trust.

Root Trust (also referred to as: RT, Root, Root Authority, or RA) is an Issuing Trust that may have the power to create and/or remove digital coins from the economy. Furthermore, the Root Trust may determine the unit of the currency. The Issuing Trusts under the Root form the jurisdiction. For example, United States Federal Reserve may represent a Root Trust. The Root Trust, as described herein, may be represented by one or more computer systems, servers, devices, software, databases, networks, protocols, and/or applications that provide the services of the Root Trust.

Digital Coin (also referred to as: Coin, Digital Currency, Currency, Digital Cash) is a digital or electronic representation of a cash value that may behave like real physical cash. A Digital Coin may be represented by its unique identifier (ID), its Signature, or in general by Digital Coin Information.

Digital Coin Information (also referred to as: Digital Coin Info, Coin Info, Coin Data Structure, CI) is a set of information associated with a Digital Coin. Examples of this information include, without limitation, Value of the Coin, Signature of the Coin, Identifiers of the Coin, a public key associated with the coin, a timestamp, Information regarding Issuing and Root Trusts, Trust Model, and other information.

Digital Coin Identifier. A subset of Digital Coin Information that uniquely identifies a Digital Coin.

One Way Hash (also referred to as: OWH) uniquely represents a given data. It is computationally difficult, and for all practical purposes impossible, to get the original data from a given one way hash of the data. For example, Output=OWH(input data). With only the given 'output', it is computationally very hard to find the value of 'input'. But if the 'input' and the function OWH is given, then the 'output' can be computed very quickly and verified. Today SHA265 algorithms are used for OWH. But OWH can be any algorithm or any combination of several algorithms chained together as described below.

Some examples of the One Way Hash are as follows:
OWH( )=SHA256( )
OWH( )=SHA256(SHA256( ))
OWH( )=RIPEMD160(SHA256( ))
OWH( )=BASE58(OWH( ))
OWH( )=BASE64(OWH( ))
For a person skilled in the art, it is apparent that there are infinitely many ways an OWH can be made.

General Ledger (also referred to as: GL) is an accounting ledger where transaction information of a Digital Coin is maintained so that a transaction can be verified at any time while maintaining complete anonymity. The General Ledger may maintain incoming coin signatures (input or source signatures), outgoing coin signatures (output or resultant signature), coin operator, and/or the timestamp. The General Ledger, as described herein, may be represented by one or more computer systems, servers, devices, software, networks, protocols, databases, and applications that provide the services of the General Ledger.

Coin Signature is a unique sequence of characters that uniquely represents a coin. For example, Coin Signature=Encrypted OWH (Digital Coin Information). Given the Coin Signature, it is computationally impossible to find the coin information or the transaction information of the coin.

Coin Operations: Coins can be generated, merged, split, transferred, or deleted. An Issuing Trust has an authority to operate on a coin. Coin operators transfer a coin or set of coins to another coin or set of coins of equal value. In some situation, these operators transfer a financial value to a coin or set of coins and transfer a coin or set of coins to a financial value. Further coins may be created or destroyed by the Root Trust.

Digital Wallet (also referred to as: Wallet, DW) is a trusted application with secured storage. This application can run in any computing device with microprocessor, memory, storage, display, communication methods, and one or more operating systems. Digital Wallet securely stores the Digital Coins, securely transfers a Digital Coin to another Digital Wallet, and securely receives a Digital Coin from another Digital Wallet or an Issuing Trust.

Overall Architecture

FIG. 1 describes an example embodiment of the overall architecture of various components. FIG. 1 shows a Payer 200 who has his coins managed in a Digital Wallet 400, and a Payee 202 who has her coins managed in a Digital Wallet 500. From here on, the Payer 200 is referred to as a male and the Payee 202 is referred to as a female for the discussion purposes. In an example, the Payer 200 wants to send 100 units of Digital Coin to the Payee 202. The Digital Wallet 400 builds a Digital Coin 300 of 100 units by working with its Issuing Trust 600 via a Network 100. The network 100 is representative of many different types of networks, such as cable networks, the Internet, local area networks, mobile telephone networks, wide area networks and wireless networks, or a combination of such networks. The Digital Coin 300 can comprise one coin worth of 100 units or multiple coins of total value 100 units. Digital Wallet 400 sends the Digital Coin 300 to the Digital Wallet 500 securely via the Network 100. Digital Wallet 500 receives the coin 300, validates the Payer 200, validates the coin 300, and the Issuing Trust 600 as per one or more policies and sends an acknowledgement. Example embodiments of Digital Wallets are described in FIG. 2, FIG. 3, FIG. 4, and FIG. 5. Example embodiments of how a Digital Wallet transfers a Digital Coin to another Digital Wallet are described in FIG. 9a, FIG. 9b, FIG. 10a, FIG. 10b and FIG. 10c.

The transaction is updated in one or more General Ledgers (800, 802, . . . ) with a transaction record that includes information that may or may not reveal the true identities of the Payer 200, the Digital Wallet 400, the Payer 300, the Digital Wallet 500, the coin 300, the Issuing Trusts (600, 602 . . . ), and Root Trusts (980, 982 . . . ) that may be involved in the transaction. The General Ledger (800, 802 . . . ) is described in FIG. 14, FIG. 15a, FIG. 15b and FIG. 15c.

Various Embodiments of a Digital Wallet. The techniques and systems described herein may be implemented in a number of ways. Example implementations are provided below with reference to the following figures. FIG. 2, FIG. 3, FIG. 4, and FIG. 5 that describe various embodiments of a Digital Wallet.

Figure 2:
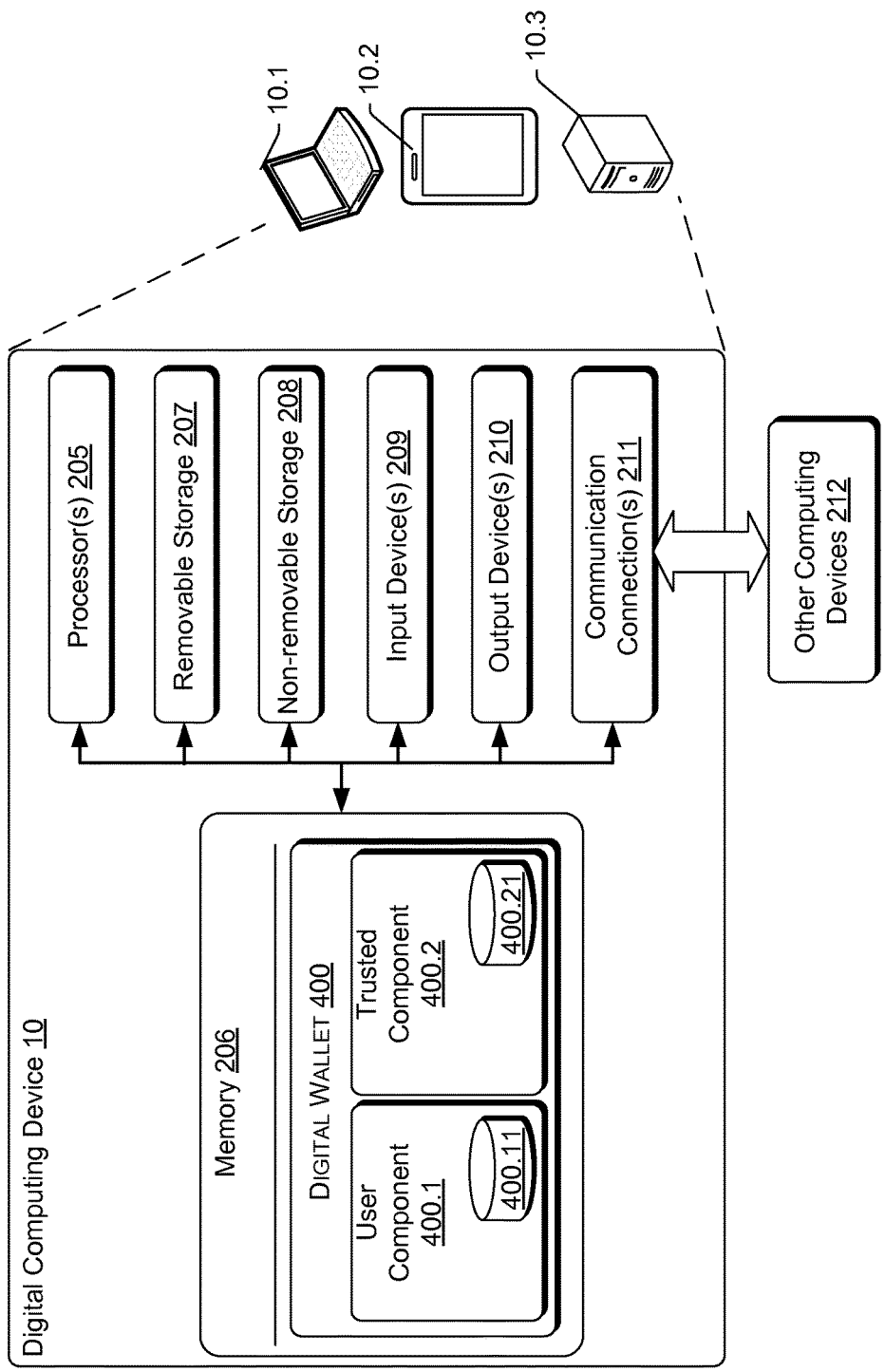
FIG. 2 is a representative block diagram of first embodiment of a Digital Wallet that further illustrates a representative computer system that may be configured to a Digital Wallet

FIG. 2 describes an example implementation of a Digital Wallet 400 inside a computing device 10. The Digital Wallet 400 may comprise an integrated hardware-software application. Computing device 10 can be a laptop 10.1 or a mobile phone or a tablet 10.2 or a personal computer (PC) or a Server 10.3, or any similar computing device including, without limitation a portable digital assistant (PDA), a wearable computer (e.g., activity trackers or wristbands, smart watch, etc.), a set top box, television, game console, portable media player, a portable game player, and so forth. In one embodiment computing device 10 is a mobile device and the Digital Wallet 400 is a Mobile Wallet and is implemented in the mobile device 10, wherein all or a portion of the Digital Wallet's 400 components run within the mobile device 10. Digital Wallet 400 may have integrated hardware-software logical components such as: a User Component 400.1 and a Trusted Component 400.2. These two components 400.1 and 400.2 can be implemented separately or can be a single hardware-software application. For discussion purposes, the two components 400.1 and 400.2 are described as two separate modules securely communicating with each other.

User Component 400.1 is an end user component for the user to manage Digital Coins and Digital Coin transactions. The User Component 400.1 may have a graphical user interface (GUI) for the user to view Coins, select a Payee or enter a Payee's address, select and send Coins to a Payee, receive coins from a Payer, deposit coins into the Digital Wallet 400 secure storage, view transactions, view history, and/or view Transaction and other Ledgers among other things. The User Component 400.1 is part of the Digital Wallet 400, securely runs in the computer system 10, and securely communicates with the Trusted Component 400.2. The User Component 400.1 has a storage component 400.11 to securely store end user transaction information of a coin transaction. The storage component 400.11 may comprise a hardware storage component 400.11.

Trusted Component 400.2 is a secure and trusted component of the Digital Wallet 400 that can securely send and receive money, validate and communicate with Issuing Trusts and other Digital Wallets, securely store and manage digital coins, private keys of Digital Coins, Digital Wallets, and/or other secure elements of a coin and its transaction. Trusted component 400.2 may have a secure storage component 400.21 to store and manage secure elements of a transaction. The secure storage component 400.21 may comprise a hardware storage component 400.21. Further, a Digital Wallet 400 may have a Public Key and a Private Key cryptographic key pair. The Private Key is securely managed by the Trusted Component 400.2 whereas the Public Key may be publically available in a public ledger or with a Certificate Authority for public use.

Trusted Component 400.1 and User Component 400.2 can authenticate each other and communicate with each other via secure protocols. Examples of such protocols include, but are not limited to: SSL, TLS, HTTPS, DTLS, S-HTTP, SOAP, CoAP, or REST.

FIG. 2 is one embodiment of how User Component 400.1 and Trusted Component 400.2 can be implemented. In this embodiment both components 400.1 and 400.2 run under the Digital Computing Device 10. The components 400.1 and 400.2 can be a single integrated application. There are various other ways the trusted and user portion of the Digital Wallets can be implemented as described in FIG. 3, FIG. 4 and FIG. 5.

The computing device 10 may include various additional components. In at least one configuration, the computing device 10 comprises one or more processors 205 and computer-readable media 206. The computing device 10 may also include additional data storage devices (removable and/or non-removable) such as, for example, magnetic disks, optical disks, or tape. Such additional storage may include removable storage 207 and/or non-removable storage 208. Computer-readable media 206 may include, at least, two types of computer-readable media 206, namely computer storage media and communication media. Computer storage media may include volatile and non-volatile, removable, and non-removable media implemented in any method or technology for storage of information, such as computer readable instructions, data structures, program modules, or other data. The system memory 206, the removable storage 207 and the non-removable storage 208 are all examples of computer storage media. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that may be used to store the desired information and which may be accessed by the computing device 10. Any such computer storage media may be part of computing device 10. Moreover, the computer-readable media 206 may include computer-executable instructions that, when executed by the processor(s) 205, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 10 may include one or more input devices 209, such as a touch screen display, physical buttons (e.g., keyboard or keypad), cameras, a microphone or microphone array, pointing devices (e.g., mouse, pen, stylus, etc.), remote controls, or any other suitable input device for interfacing with the computing device 10.

The computing device 10 may include one or more output devices 210 such as a display, speakers, or any other suitable output device coupled communicatively to the processor(s) 205 and the computer-readable media 206. The computing device 10 may further contain communications connection (s) 211 that allow the computing device 10 to communicate with other computing devices 212 such as via a network. The other computing devices 212 may include other computing devices similar to the computing device 10, or a server computing device, a database, and so on.

Figure 3:
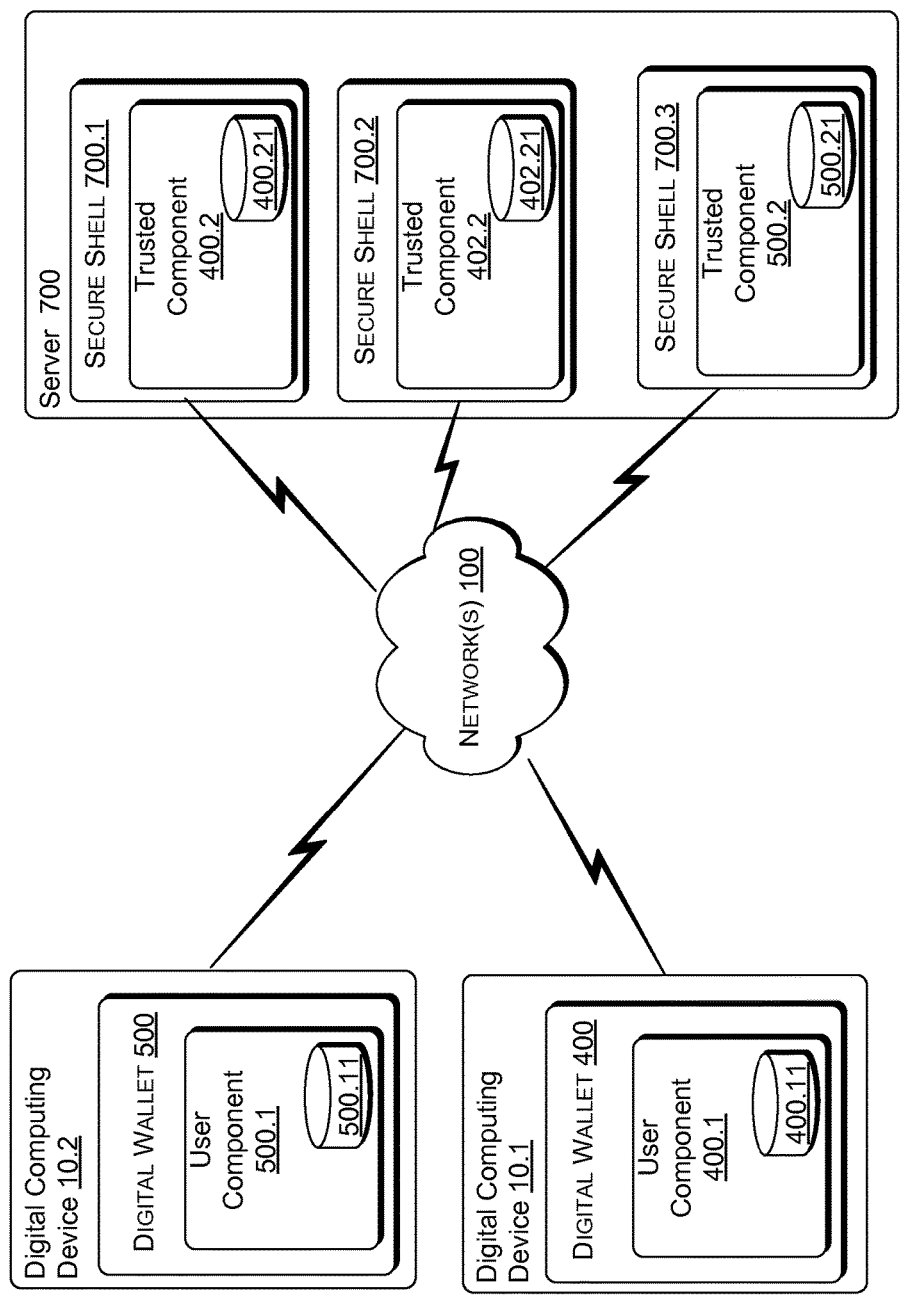
FIG. 3 is a representative block diagram of a second embodiment of a Digital Wallet

FIG. 3 describes an embodiment in which the Trusted Component 400.2 of the Digital Wallet 400 resides and runs in the Issuing Trust's servers/cloud 700. In this embodiment, the server/cloud 700 may provide services of the Issuing Trust using one or more servers, storage, and/or applications, or using hosted services, or using Cloud services provided by a third party vendor. The servers 700 may include one or more processors and computer-readable memory storing computer-executable instructions that, when executed by the one or more processors, perform acts associated with the various techniques described herein. The processors and memory of the server(s) 700 may be of the same, or similar, form to those described with reference to FIG. 2 in regards to the processor(s) 205 and the memory 206. A secure shell application 700.1 of the Issuing Trust provides hardware and software for the trusted component 400.2 to run securely. Secure shell 700.1 may be a firewall, a virtual space, or virtual sandbox that provides complete separation of the code and data in Trusted Component 400.2 to run securely and prohibit any type of attacks or attempts to steal or modify the data, coins, keys, and/or code. This is the Issuing Trust's code and a user's access to this code may be provided via secured channel with high level of authentication. In this model, the Issuing Trust manages the trusted component 400.2, coins, and the related keys of the user's Digital Wallet 400 and executes the transaction on behalf of the Digital Wallet 400. Trusted Component 400.2 and User Component 400.1 communicate via a secured channel using any suitable protocol, as described herein, through network 100. Digital Wallet 400 comprises components 400.1 and 400.2 while the trusted component 400.2 resides within the secure shell 700.1 in the server(s) 700. The server 700 may include secure shells 700.2 and 700.3 for other Digital Wallets, which may include trusted components 402.2 and 500.2, respectively.

Figure 4:
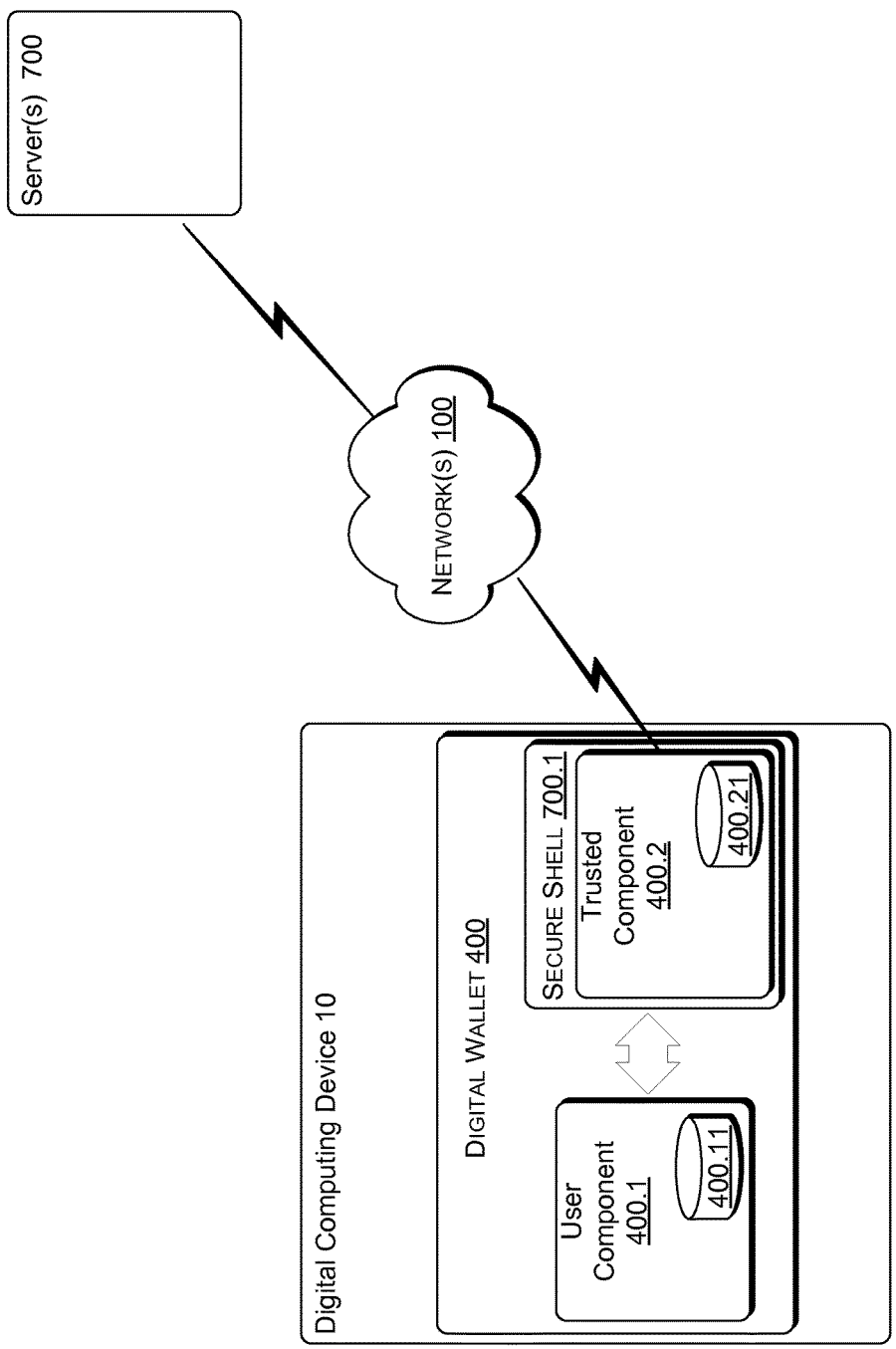
FIG. 4 is a representative block diagram of a third embodiment of a Digital Wallet

FIG. 4 describes another embodiment of the Digital Wallet 400. In this embodiment, the Trusted Component 400.2 resides and runs in the user's client device 10 along with the User Component 400.1. Code for the Trusted Component 400.2 may be verified, trusted, and attested by the Issuing Trust and may run under a Secure Shell 700.1 issued by the Issuing Trust. The code for the Trusted Component 400.2 is trusted and verified by the shell 700.1 and the servers 700 each time the code executes. The shell 700.1 stored on the digital computing device 10 can have intermediate check points in the code and data; randomly validating the transaction through its duration. The shell 700.1 is a secure shell issued and verified by the Issuing Trust and runs within the operating system of the Digital Computing Device 10. This sandbox can contain the entire Digital Wallet 400 (or specifically Trusted Component 400.2), a secure storage for coins, secure storage for keys, and other elements that may be used in a transaction. Trusted component 400.2 may run inside this virtual sandbox (i.e., the secure shell 700.1), which is created by the Issuing Trust and maintained inside the transaction device (e.g., the computing device 10). In this model, secure shell 700.1 (Virtual Sandbox) can verify the signature of the binary before it executes. Furthermore, the secure shell's 700.1 (sandbox's) signature may get verified by the Issuing Trust at multiple instances. If there is a change in the secure shell 700.1 (sandbox) or in the code, if there is unauthorized access of data, or if any kind of fraud is detected, then the secure shell 700.1 (virtual sandbox) can lock the code for the Trusted Component 400.2 and terminate the operation.

Figure 5:
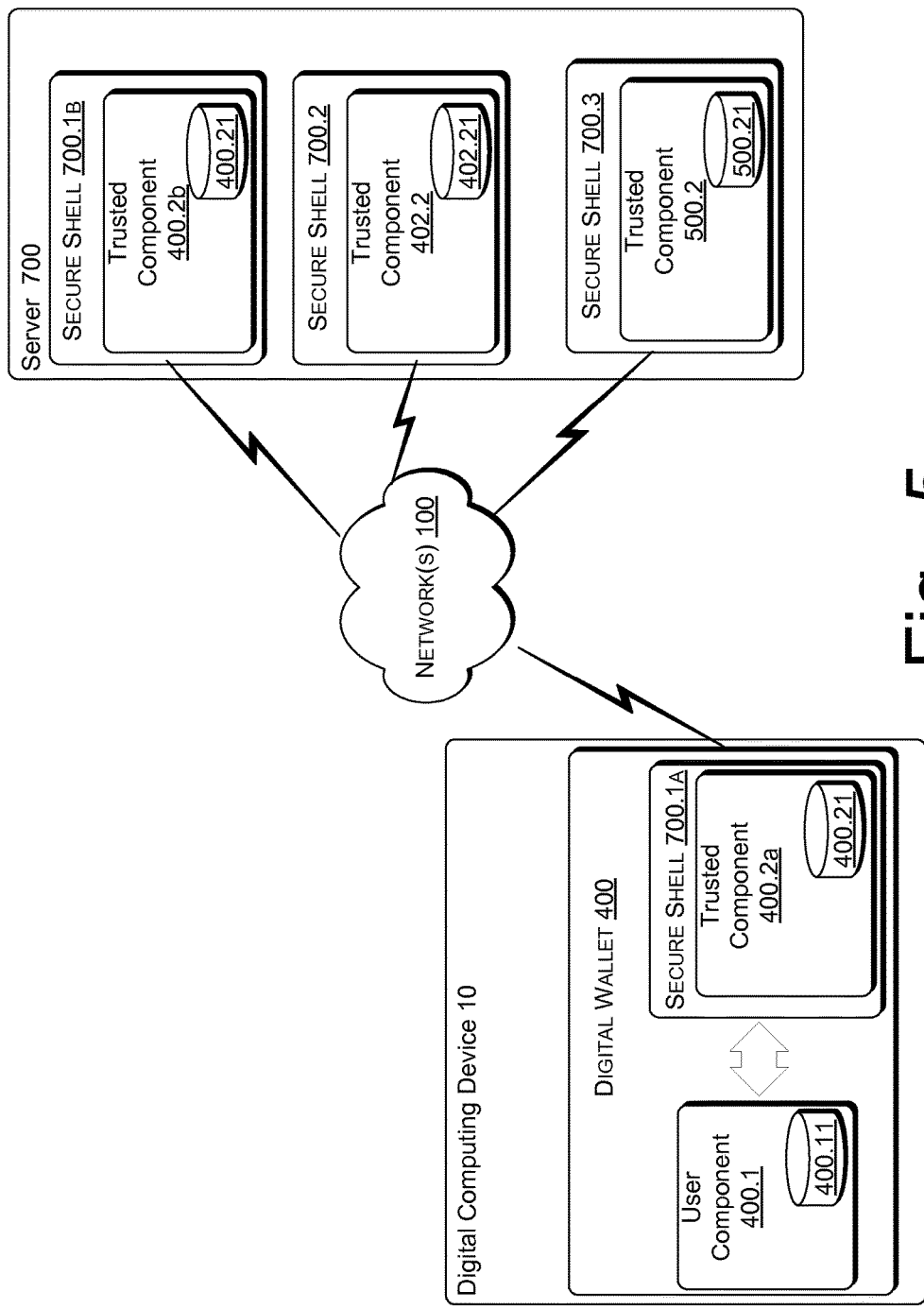
FIG. 5 is representative block diagram of a fourth embodiment of a Digital Wallet

FIG. 5 describes another example embodiment of the Digital Wallet 400. In this embodiment, a portion 400.2a of the Trusted Component 400.2 resides and runs in the user's client device 10 along with the User Component 400.1 under a secure shell 700.1a of the server 700. Another portion 400.2b of the Trusted Component 400.2 resides and runs under a Secure Shell 700.1b of the server 700. Components 400.2a and 400.2b of the Trusted Component 400.2 can share responsibilities and can vary from implementation to implementation.

Each Digital Wallet is associated with an Issuing Trust. Each Wallet has, for its Issuing Trust, IT information, the IT's public key, and the method to connect and authenticate with its IT. Each IT has a database of its Wallets with information like the Wallet's public key, login-id, password and other authentication information along with various transaction information. A Wallet communicates with its IT for generating coins, merging, splitting, transferring, or validating Digital Coins.

The above-mentioned Digital Wallet implementations are examples. A person skilled in the art will easily understand that the entire Digital Wallet can be implemented in the cloud and can be managed by a third party, for example. The Wallet can be a Web Application, Mobile Application, or a distributed Web Application or may be a Client-Server application. Multiple ways and methods a Digital Wallet can be implemented.

Digital Coins and Digital Coin Info: The techniques and systems described herein may be implemented in a number of ways. Example implementations are provided below with reference to the following figures: FIG. 12a, FIG. 12b, FIG. 12c, FIG. 12d, and FIG. 12e.

In one embodiment a Digital Coin may be represented by a unique ID. This unique ID can be generated by an Issuing Trust or the Digital Wallet when the Issuing Trust generates a new coin. This unique ID can be a public key of the coin, a OWH (public key), a OWH (private key), or the unique ID can be generated using some other method so that it is unique across the jurisdiction where the coin is accepted and used. In one embodiment, this unique ID is an example of an identifier that uniquely identifies a Digital Coin.

Digital Coin Information is a set of information that describes a Digital Coin. The Digital Coin Information may include the unique ID(s) of the coin. A Digital Coin can be identified with the unique ID, or the Digital Coin Information, or a subset of the Digital Coin Information.

Figure 12A:
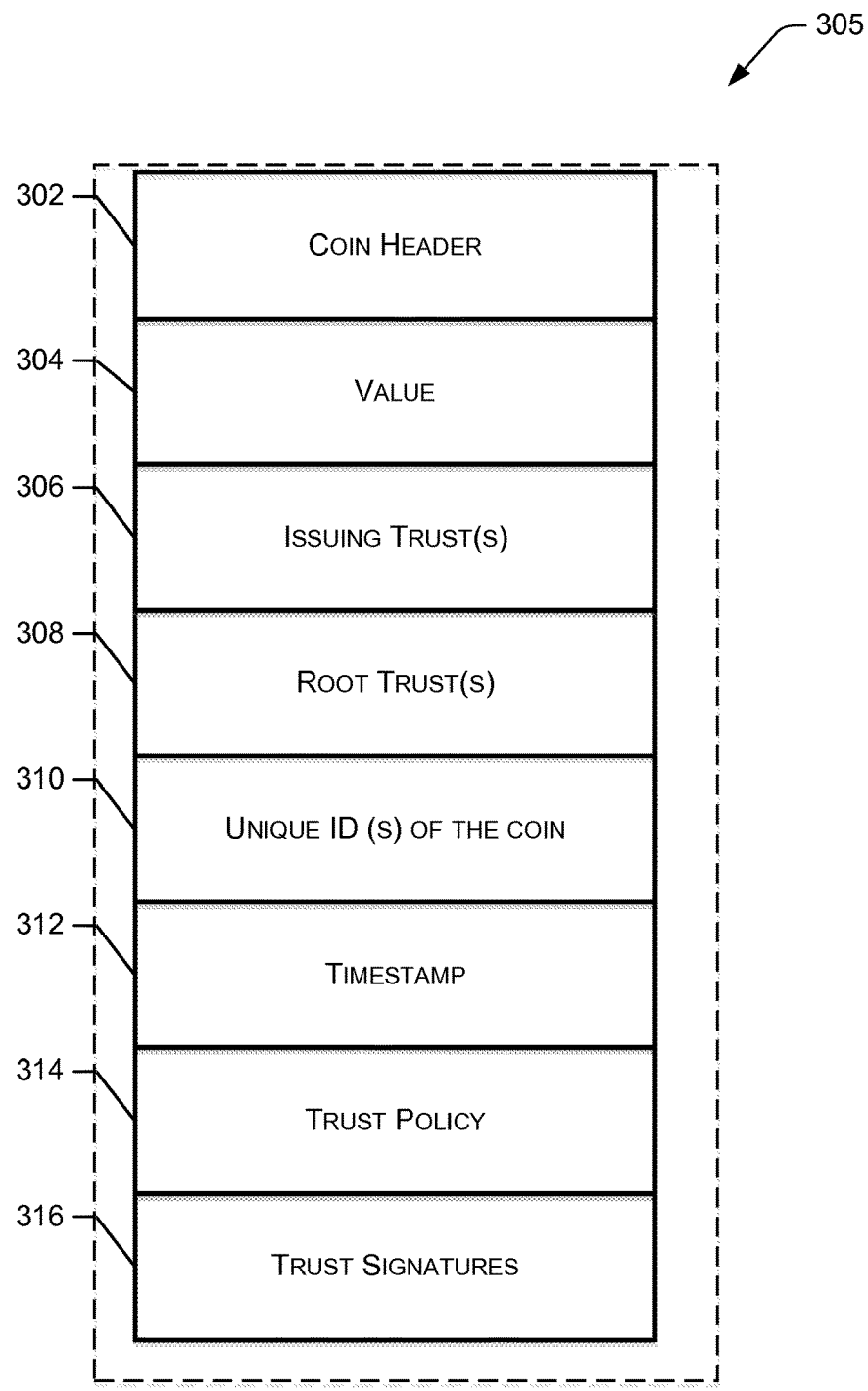
FIG. 12a is representative block diagram that represents a Digital Coin and the associated Information

FIG. 12a is an example implementation of the Digital Coin Information 305. A Coin Header 302 may contain the size of the data structure for the Digital Coin Information, owner of the coin (public key of the Digital Wallet that has this coin), type of the coin, life or expiry date of the coin, and/or encryption information among other things. Type of the coin may be one of and not limited to: cash value, check, cashier's check, credit, or any other suitable type. Life of the coin may comprise a number of days the coin is valid or an expiry date of the coin. For cash value, an expiry date may or may not be applicable. For check and other types of instruments, the life of the coin field may have a set value.

Value 304 is a data structure containing information related to the value of the Digital Coin. It may include unit of the value, value in terms of number of units, and various elements that may be represent the value of the coin. For example, if the unit is US dollar and the number of units is 350, then the Value 304 represents a Digital Coin worth US $350. As a second example, the unit is Indian Rupee and the number of units is 4500. In this example, the Value 304 represents a Digital Coin worth Rs. 4500.

Issuing Trust(s) 306 represents the Issuing Trust that issued this coin. The Issuing Trust 306 of the Digital Coin Information 305 may be a data structure containing multiple Issuing Trusts. Generally this will be the Issuing Trust of the Wallet that has this Digital Coin. A Root Trust 308 represents one or more Root Trusts of the Issuing Trust 306. It may be a data structure containing multiple Root Trusts. Both 306 and 308 can be represented using their public keys, respectively.

Unique ID 310 is the unique ID of the coin as described herein. If this unique ID is different from the public key of the coin, then unique ID 310 can be a data structure that contains both the unique ID and the public key of the coin. Since generally Digital Coins are owned by Digital Wallets, a Digital Wallet may generate a private and public key pair for a Digital Coin and may send the public key of the Digital Coin to the Issuing Trust to generate the Digital Coin. In another embodiment, Digital Wallets can simply use their own Wallet public key for the Digital Coin. In this situation, the unique ID of the Digital Coin can be different from the public key and can be generated by the Wallet or the Issuing Trust. One embodiment of the Digital Coin generation process is described in FIG. 9b.

Timestamp 312 represents a universal timestamp in which the coin was generated by the Issuing Trust 306. Examples include UTC, UNIX Time, GMT, TAI, Formats like ISO 8601, and so on.

Figure 6:
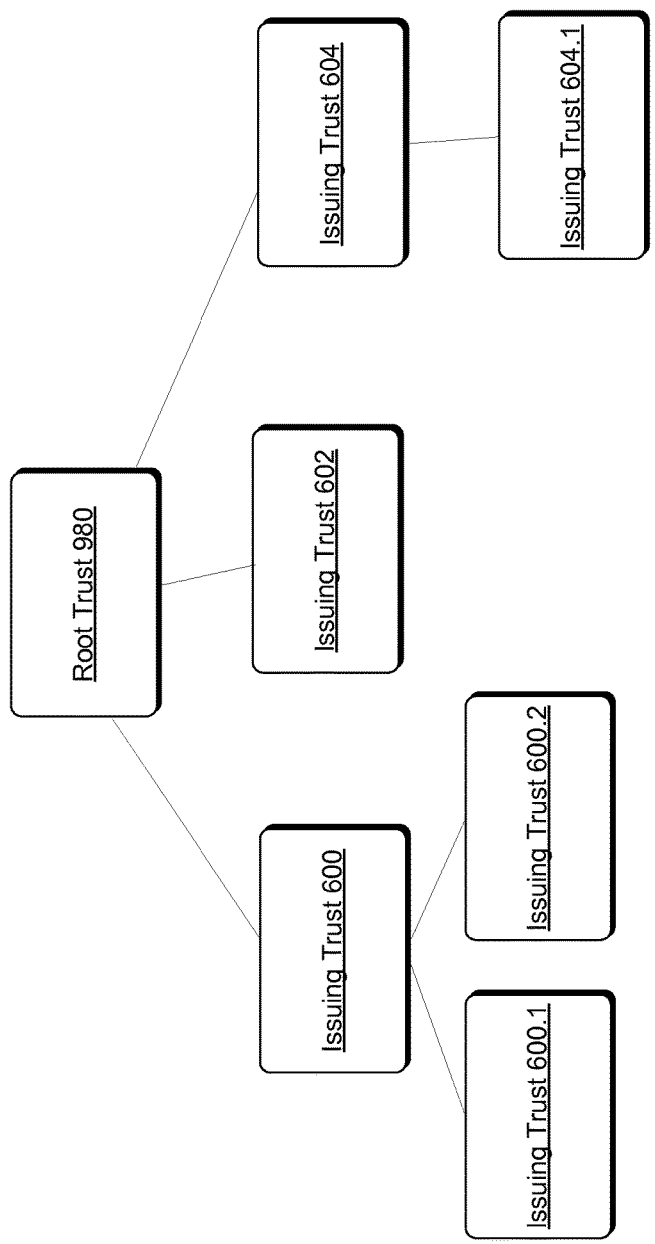
FIG. 6 is the first embodiment of an example Trust Architecture
Figure 7:
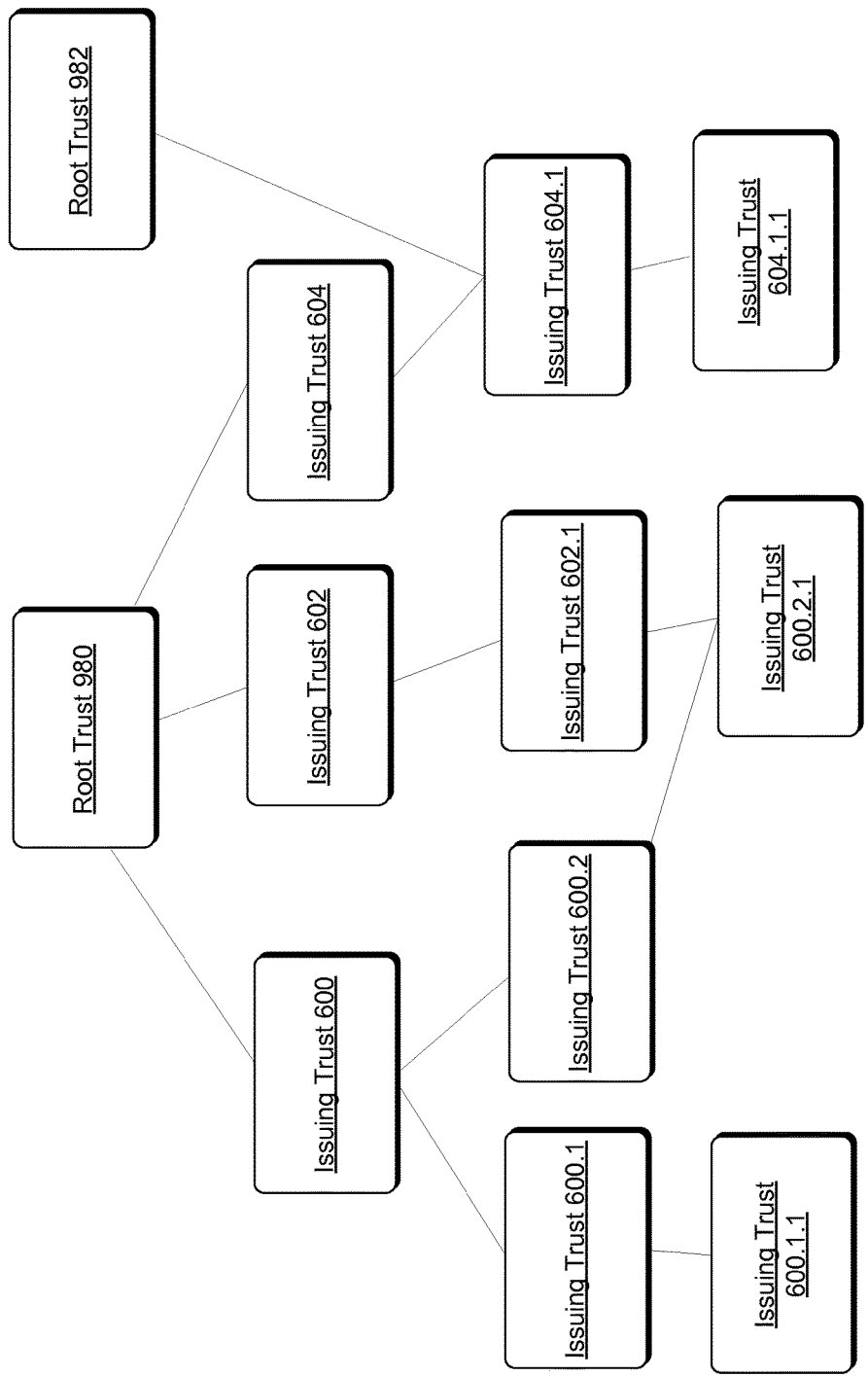
FIG. 7 is a representative block diagram of the second embodiment of the Trust Architecture
Figure 8:
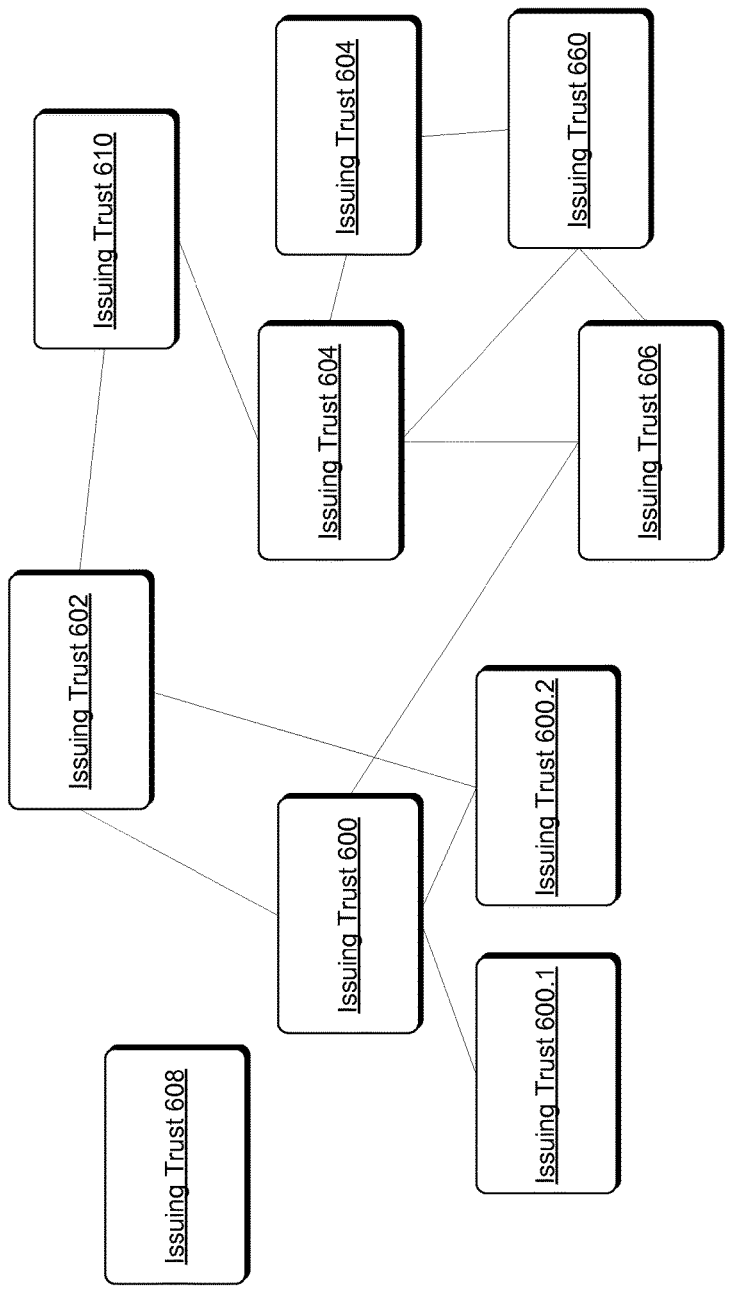
FIG. 8 is a representative block diagram of the third embodiment of the Trust Architecture

Trust Model 314 represents the Trust model of the coin. If the receiving computing system of the coin is to validate the coin, then the receiving Wallet and/or its Issuing Trust can use this Trust Model 314 to validate the incoming coin as per the information available in the Trust Model 314. This trust model 314 may contain the entire organization of the trust in which the Issuing Trust is part of. In one embodiment, the trust model 314 is a model described as set of policies for the receiver and sender to verify the trust. In another embodiment, the trust model 314 is a script that verifies the trust. In another embodiment, the trust model 314 is a data structure (e.g., XML) that outlines the trust architecture. The verification of the trust is done by the receiving entity of the coin. Various Trust Models are described in FIG. 6, FIG. 7 and FIG. 8. Trust Signatures 316 can be a data structure that contains the signatures of various Trusts described in the Trust Model. There are several example implementations of how these signatures 316 can stack upon each other described in FIG. 13.

The structure of the Digital Coin Information 305 described above is an example implementation of a Digital Coin Information 305. This information or the subset of the information 305 is used to generate a Digital Coin that holds the true economic value as described in the following sections. A Digital Coin is generated (or gains its economic value) when, as per the Trust Policy, Issuing Trusts and Root Trusts signs the Coin Information 305, and a General Ledger is updated. Digital Coins are constructed by the Issuing Trust of the Digital Wallet. The construction of a Digital Coin may comprise the steps of:

a. receiving a request that includes at least a value
b. building information to be associated with a Digital Coin (e.g., the Digital Coin Information 305) for the value of the request
c. obtaining a first signature associated with an Issuing Trust
d. adding the first signature to the Digital Coin Information 305
e. sending the Digital Coin Information 305 with the first signature to Digital Wallet
f. receiving a second signature associated with the Digital Wallet
g. updating a General Ledger with a record entry for the digital coin, and
h. sending an acknowledgement FIG. 9a describes an example implementation of a signature process 900 that leads into the formation of a Digital Coin. In this process 900, a Digital Coin is formed and obtains its true economic value as described in the Digital Coin Information 305. The General Ledger provides the proof of existence of the coin, and the Signatures provide the proof of validity, proof of ownership, and proof of the value of the coin.

Figure 12D:
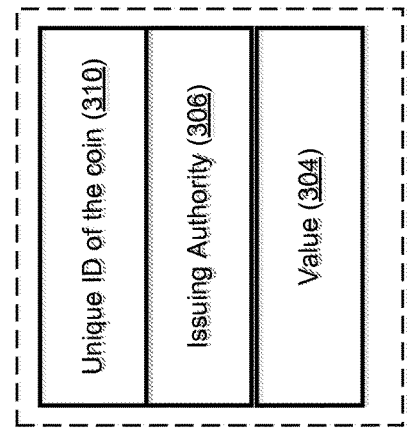
FIG. 12b, FIG. 12c, FIG. 12d, FIG. 12e are representative block diagrams that represents various embodiments of a Digital Coin and the associated Information
Figure 12C:
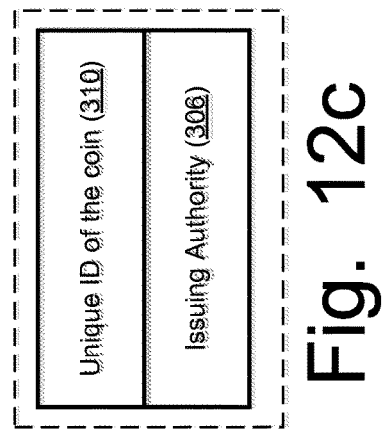
Figure 12B:
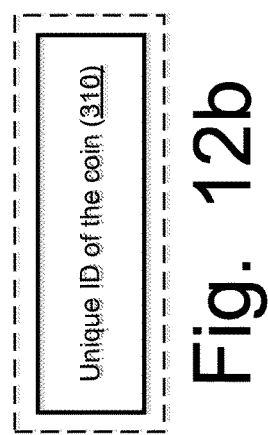
Figure 12F:
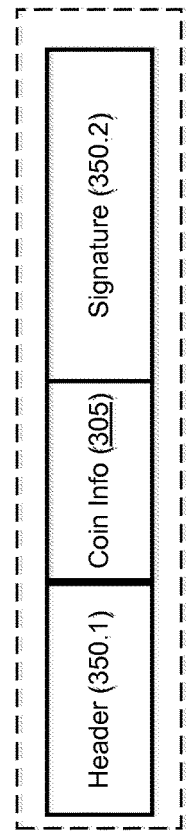
FIG. 12f is the representative block diagram of the Digital Coin Transaction Structure.
Figure 12E:
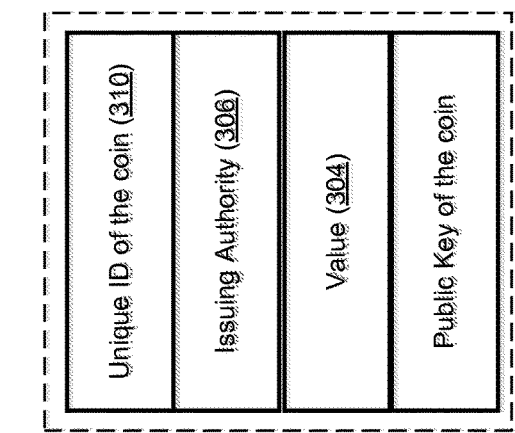

Once a Digital Coin is formed, it can be used in any transaction with its unique ID, its Coin Signature, or with a subset of Digital Coin Information 305 as described in FIG. 12b, FIG. 12c, FIG. 12d and FIG. 12e. FIG. 12b represents an example of how a subset of the Digital Coin information 305 can be used in a transaction. In the example of FIG. 12b, the Digital Coin Information 305 contains exclusively the unique ID 310 of the Digital Coin. FIG. 12c describes a data set for the Digital Coin Information 305 that has both the unique ID 310 and Issuing Authority information 306. FIG. 12d, FIG. 12e describes various other embodiment data sets that can identify a Digital Coin 300. Based on the above examples, anyone skilled in the art will appreciate that a Wallet-to-Wallet transaction can happen with a subset of Digital Coin Information 305. For example, if Payer 200's Digital Wallet 400 sends $5 worth of digital coin to Payee's 202 Digital Wallet 500, the Digital Wallet 400 can simply send the Digital Coin Identifier 310 (or a data set that is the subset of Digital Coin Information 305) as described in FIG. 12b, or a data set with IT information 306 as described in FIG. 12c. But, for example, if an amount above a threshold amount (e.g., $5 Million) of coin needs to be sent, Payee 202 may not accept simply the Unique ID 310. Payee 202 might require additional information, as described in FIG. 12a. In this case, Payer 200 may provide other information as required by the Payee 202.

Figure 9B:
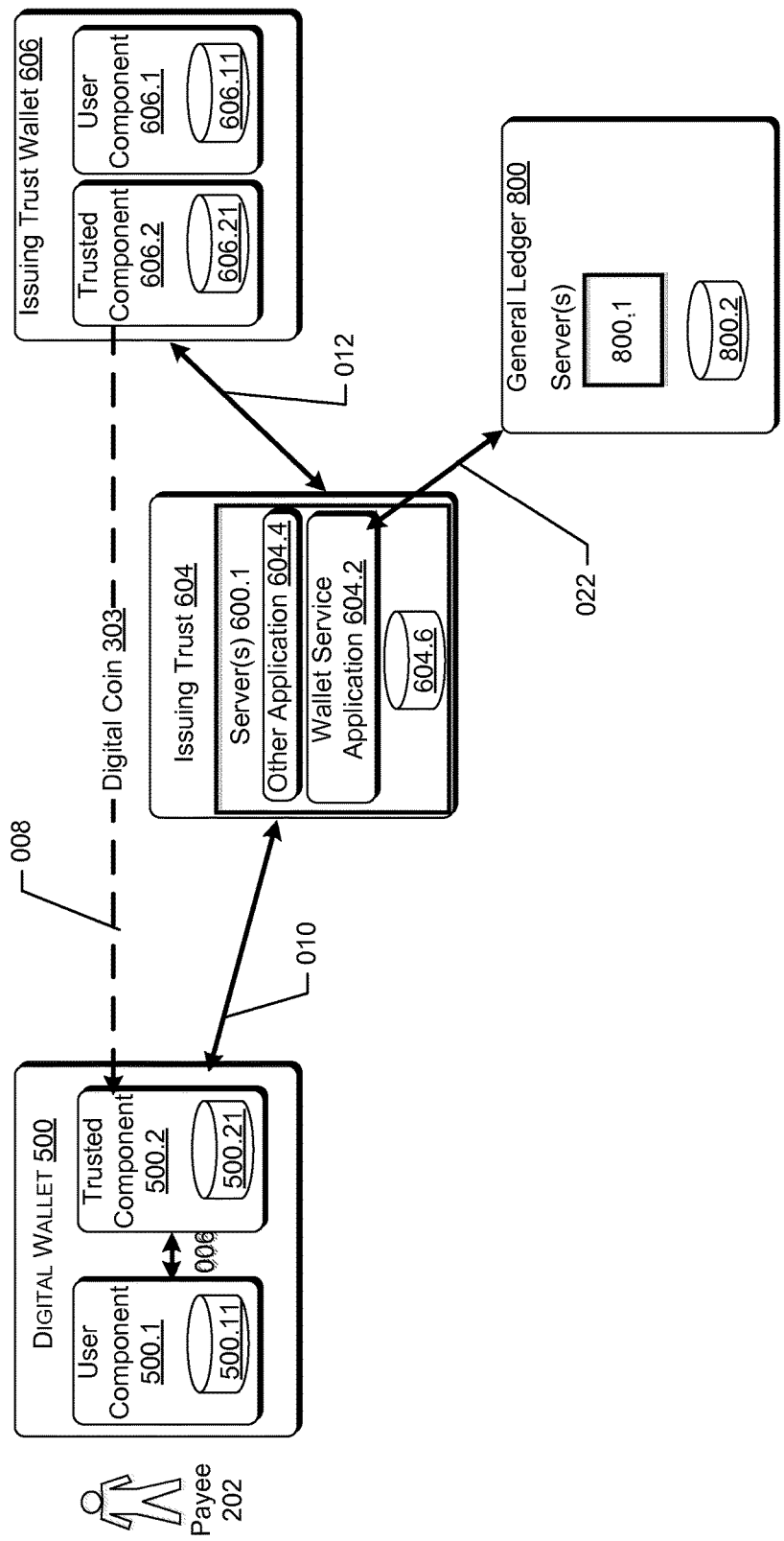
FIG. 9b is a representative flow diagram of first embodiment of a Digital Coin Transaction.

Generating and Managing Digital Coins: Information related to a Digital Coin, it's Private Key and the Signatures are stored and managed inside a Digital Wallet. A Digital Wallet can send a Digital Coin or receive a Digital Coin. To generate a new Digital Coin from another Coin (or Coins), or from a Physical Cash, or from a Bank Account, the Wallet uses it's ITs' Wallet Services. FIG. 9b describes an example implementation of generating and receiving new coins.

Digital Coin Signature: A Digital Coin, once generated by the Issuing Trust 604 (shown in FIG. 9b), has the signatures of the Issuing and Root Trusts, as specified by the Trust Policy. Several embodiments of this signature stack are described in FIG. 13. The Trusts who signed the Digital Coin maintain a record with details about the Coin's unique ID, signature, and timestamp among other things. Once the signatures are in-place, Digital Wallet 500 signs the coin on top of the signatures as an acknowledgement that Digital Wallet 500 received the coin from IT 604. IT 604 validates this signatures and updates the General Ledger 800. The coin is now available in the system. This signature or OWH (signature), or the encrypted OWH (signature) is the Digital Coin Signature. This signature is used in various ledgers in the Issuing Trust 604, the Issuing Trust's Wallet 606, the GL 800, and/or other ledgers and records as a reference to the Digital Coin. In some embodiments, the Digital Coin unique ID is used as the Digital Coin Signature in the ledgers. Details of a how a Digital Coin is generated, transacted, and how a General Ledger is updated are described in the following sections. An example implementation of the Digital Coin Signature process is described in FIGS. 9a and 9b.

Generating Digital Coins: FIG. 9b describes an example implementation of Digital Wallet 500 receiving the Digital Coin 303 from the Issuing Trust 604. The Issuing Trust 604 can have its own Wallet 606 to generate Digital Coin 303 on its behalf Once the coin 303 is generated, the DW 606 can send the Digital Coin 303 to the Trusted Component 500.2 directly, or the Digital Coin 303 can be sent to the IT 604 via path 012 and the IT 604 can send the coin 300 to the DW 500 via path 010. In practice, if the user (Payee) 202 has a savings account with a Financial Institution 604 and wants to withdraw money, then the Financial Institution 604 authenticates the user 202, authorizes his request for withdrawal, instructs its Digital Wallet 606 to generate a Digital Coin 303, and sends it to Digital Wallet 500 and updates the GL 800. FIG. 9b describes an example implementation of the generation of Digital Coin 303. FIG. 9a explains this example implementation in detail with the signature process 900. Two example situations in which a new Digital Coin needs to be generated by the Issuing Trust were discussed: (i) A New Digital Coin is generated against a withdrawal from a Bank Account, or (ii) New Digital Coin is generated against an old Digital Coin signed by another IT. There are various other situation in which a new Digital Coin may be generated, including, and without limitation to: A Digital Coin is to be generated when the user cashes a check, when he uses his credit/debit/gift card to withdraw money, or when merging two coins, or splitting a coin into multiple other coins, or when the user would like to convert physical cash into a Digital Coin, or would like to generate a Digital Coin against other type of digital coins, and so on.

Digital Coin Signature Process (FIG. 9a): The processes described herein are illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the likes that perform particular functions or implement particular abstract data types. The order in which the operations are described is not intended to be construed as a limitation, and any number of the described blocks can be combined in any order and/or in parallel to implement the processes.

FIG. 9a describes an example implementation of the Digital Coin Signature Process which will lead into the formation of the Digital Coin. FIG. 9b is used in this description to explain this process in FIG. 9a.

Step 902: Digital Wallet 500 constructs a request for a Digital Coin and sends it to its Issuing Trust 604. In some embodiments, DW 500 and IT 604 authenticate themselves and establish a secure communication channel for them to communicate. In some embodiments, the Digital Wallet 500 may create a data set with the unit, value, and the public key for the newly requested Digital Coin 303. DW 500 may have its own Wallet public key in the dataset or public key of the Digital Coin 303. DW 500 may also send information regarding the funding of this coin. This will include old coins or physical cash or financial account information, credit/debit card information or financial instrument and so on.

Step 904: Issuing Trust 604 receives the request and associated information, validates the information and builds the Digital Coin Information 305 as described in the example implementation of FIG. 12a. IT 604 may add the pre-negotiated Trust Policy for DW 500 as part of this Digital Coin Information 305. Let us call this Digital Coin Information "X" for purposes of describing the process 900 of FIG. 9a. This information X will include 302 to 314 as described in the example implementation of FIG. 12a.

Step 906: Issuing Trust 604 verifies (or checks) whether any signature is required for the Digital Coin 303 as per the Trust Policy to build the Digital Coin 303.

Step 908: If a signature is required, IT 604 will retrieve the information it needs to sign this coin (e.g., information of the next Issuing Trust). Let us call the next Issuing Trust as "IT-next" (where "IT-next" may be the IT 604, or another IT, or a Root Trust). IT 604 may establish a secure connection with IT-next and get the signature of IT-next for X. In this case IT-next will get the hash of Digital Coin Information. Let us call:
 a. Hash=OWH(Digital Coin Info)
 b. Then IT-next will use its private key and encrypt this Hash.
 c. IT-next Signature=Encrypt (Hash) using Private Key of IT-next Step 910: If signatures are added on top of each other this signature is added to X as X=X+IT-next Signature. Otherwise if signatures are computed in parallel then X will not change.

Step 912: If more IT signatures are needed as per the Trust Policy, the process 900 proceeds to Step 908. If IT signatures can be done in parallel, IT signatures can be captured in parallel at Step 908.

Step 914: A new Digital Coin Information X (with the Trust Signatures) is built based on the Trust Policy.

Step 916: IT sends the new X to DW 500 using the secure channel.

Step 918: DW 500 reviews X, and if everything is agreeable, the DW 500 signs X using the private key of the Wallet 500 or the private key of the requested Digital Coin 303 depending on the public key that was originally sent as part of X. Let us call the signature of the DW 500 signature "Y". X=X+Y Step 920: DW 500 sends X to IT 604.

Step 922: IT receives X, reviews X and the Digital Signature Y.

Step 924: IT stores the information in its databases, updates the General Ledger 800, and may send an acknowledgement to DW 500. This acknowledgement can be IT's signature on top of X.

Step 926: DW 500 receives the acknowledgement. Updates its records. A Digital Coin 303 is formed.

This above signature process is an example implementation in which the Trust and the Digital Coin Signatures are generated.

Sending and Receiving Digital Coins: The techniques and systems described herein may be implemented in a number of ways. Example implementations are provided below with reference to the following figures FIGS. 10a, 10b and 10c. These figures describe various embodiments of sending a Digital Coin from one Digital Wallet 400 to another Digital Wallet 500.

Figure 10A:
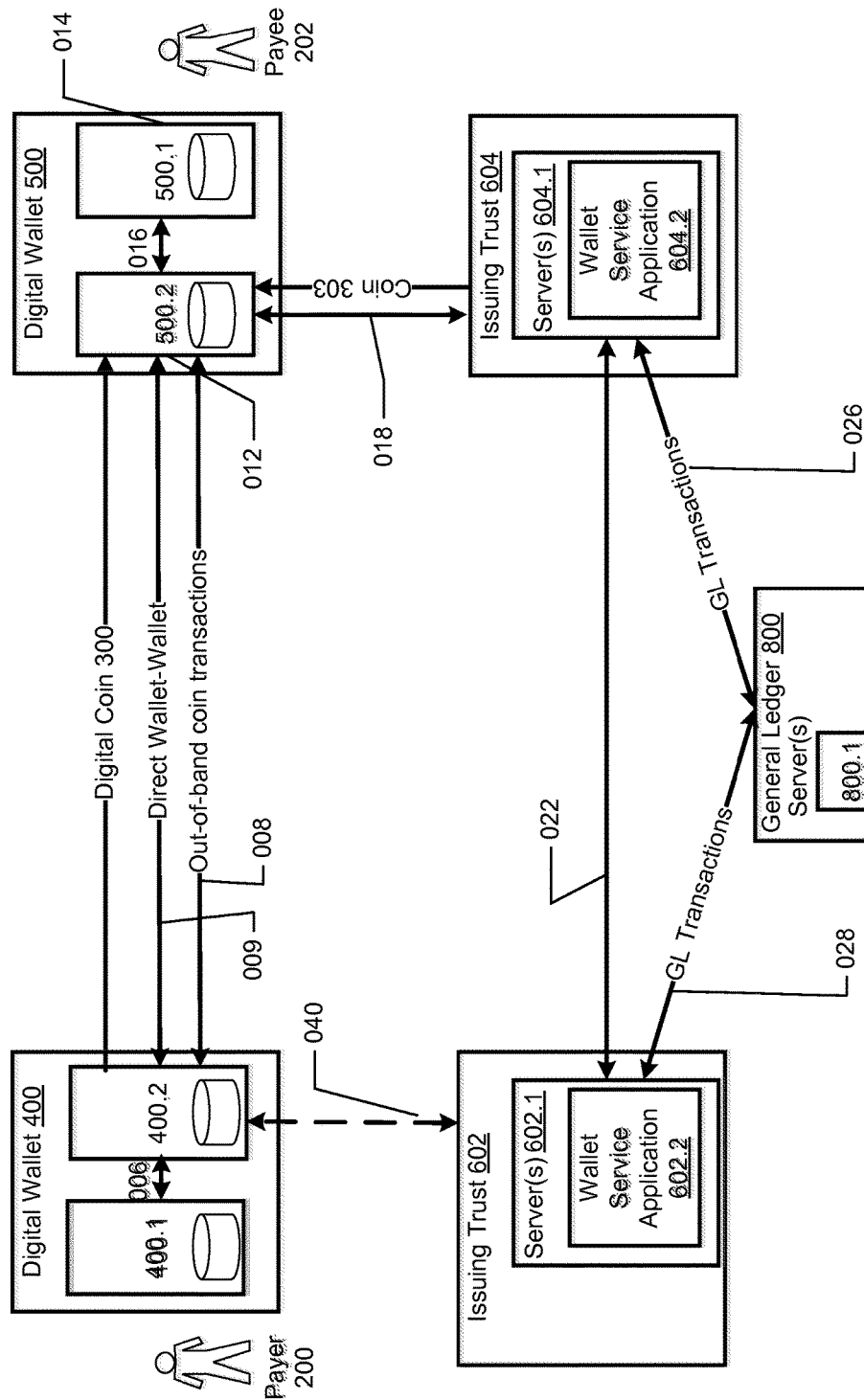
FIG. 10a, FIG. 10b, FIG. 10c are representative flow diagrams of various other embodiments of a Digital Coin Transaction

Example implementation FIG. 10a: A Digital Coin 300 is represented by its unique ID or a subset of Coin Information as described as example implementations in FIG. 12a, FIG. 12b, FIG. 12c, FIG. 12d, and FIG. 12e. This information can be transferred directly from DW 400 to DW 500 via step:009 or can be transferred out-of-band via step:008. Further, anyone skilled in the art understands that a Wallet-to-Wallet communication can happen through various other means. Examples include: DW 400 can send the Digital Coin to DW 500 via an intermediary; DW 400 can send the Digital Coin to DW 500 via DW 400's Issuing Trust 602; DW 400 can send the Digital Coin to DW 500 via DW 500's Issuing Trust 604; DW 400 can send the Digital Coin to DW 500 via both Issuing Trusts 602 and 604.

A Digital Coin 300 can be transferred from the Trusted Component 400.2 of the Wallet 400 to the Trusted Component 500.2 of the Wallet 500 directly in step:009. In step: 009, (i) Digital Wallet 400 may identify Digital Wallet 500 by using its publically known addresses like: Web Address, Public Key, IPv4, IPv6 address, Internet of Things address, and so on, (ii) Digital Wallet 400 may validate Digital Wallet 500, and Digital Wallet 500 may validate Digital Wallet 400, and (iii) a secure and encrypted communication may be established using protocols like: SSL, TLS, HTTPS, DTLS, S-HTTP, SOAP, CoAP, REST, or similar protocols. FIG. 12f describes an example transaction structure in which Digital Coin Information 305, or a subset of Digital Coin Information 305, is exchanged between Digital Wallets. Trusted component 400.2 generates the Coin Info 305, adds the header 350.1, finds the hash OWH (305+350.1), and encrypts it using Digital Wallet 400's private key to get the resultant signature 350.2, and sends this information via the already established encryption channel in step:009 of FIG. 10a to Trusted Component 500.2 of the Digital Wallet 500.

Trusted Component 500.2 receives the coin and deposits the coin in its vault (secured storage) via step:018, step:022, and step:040, and sends the acknowledgement via step:009. To make sure only Trusted Component 500.2 receives this coin and no one else, Trusted Component 400.2 can generate a session key and encrypt the entire data using the session key and encrypt the session key via Digital Wallet 500's public key. Trusted Component 500.2 receives this session key via step:009, decrypts the session key using its private key, and retrieves the session key and retrieves the coin data by using the session key. The transaction is more secure and in addition only Trusted Component 500.2 have received the coins and no one else.

Identifiers of the Digital Coins can be sent via e-mail or text or voice or any other means in step:008, and can be sent in plain text or via secure communication. When digital coins are sent with the Digital Coin unique ID or Signature, or a subset of Digital Coin Information, no one can claim the value of the coin. When the Trusted Component 500.2 deposits the coin into the Digital Wallet 500, the true economic value of the Digital Coin is realized and the money is moved from 400.2 to 500.2.

Depositing a Coin into Wallet: Let us consider an example in which Payee 202 receives the Digital Coin 300 via step:008. Payee 202, using the User Component 500.1, deposits the Coin via step:014. This step:014 can be an automated step in which an e-mail client or text client can automatically connect with the User Component 500.1 (and/or the Trusted Component 500.2) and deposit the coins. In step:016, the User Component 500.1 communicates with the Trusted Component 500.2 and asks/requests the Trusted Component 500.2 to deposit the Coin in the Wallet. Trusted Component 500.2 deposits the Coin in the Wallet via steps 018, 022, and 040. In step: 040 Trusted Component 400.2 and IT 602 validate the transaction to ensure whether the receiver Wallet 500 is the right Wallet of the Payee 202. If some man-in-the-middle (not shown in the picture) intercepted this Coin and tried to deposit into another Wallet, then in step:040, the Trusted Component 400.2 may deny the transaction and the transaction may be terminated. Once the transaction is confirmed, IT 602 verifies with the GL 800 for the existence of the Coin and a transfer entry is made in the General Ledger 800 so that DW 400 can't reuse this Coin. For example, if DW 400 sends the same Digital Coin 300 to another Digital Wallet (not shown in the picture), then a transfer entry is already made for the Digital Coin 300. Thus, when the request for DW 500 is received, the GL 800 will shows that the coin has been already used. This acts as an intrinsic lock for the coin.

In whatever way Payer 200 sends the Digital Coin 300 to Payee 202, either directly from wallet-to-wallet or indirectly through any other channel, Payee 202 will get the money only if the payee 202 deposits the money in the wallet 500. The following discussion will describe one example implementation of how the Digital Wallets and coin gets validated, how General Ledger is updated, and how the transaction is completed.

Each Digital Wallet is managed by an Issuing Trust. In FIG. 10a, the Issuing Trust 604 is an Issuing Trust of Digital Wallet 500, and the Issuing Trust 602 is the Issuing Trust of Digital Wallet 400. In step:018, Trusted Component 500.2 identifies its Issuing Trust's 604 Wallet Service application 604.2, and the Trusted Component 500.2 and the application 604.2 establish a communication with each other, and validate each other to establish a secure encrypted channel.

Figure 16A:
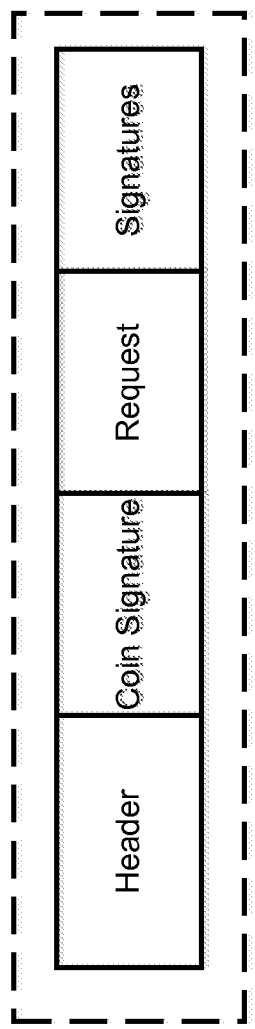
FIG. 16a, FIG. 16b are representative block diagrams of General Ledger transactions
Figure 16B:
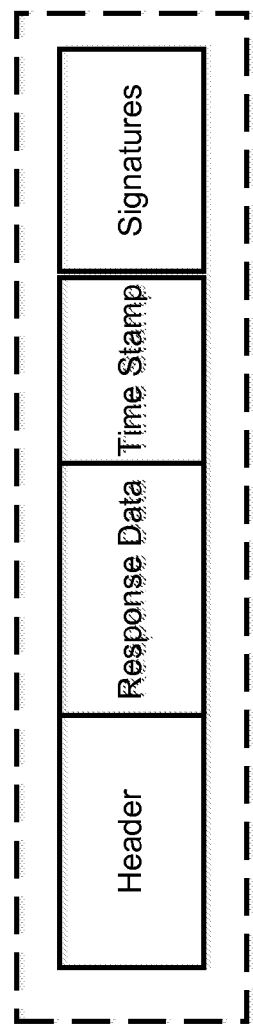
Figure 17:
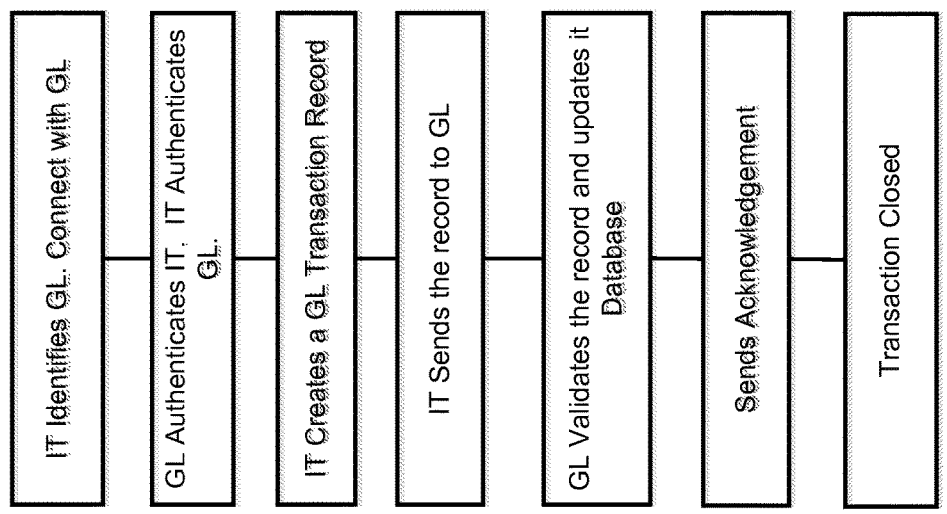
FIG. 17 is a representative flow diagram of a General Ledger record update
Figure 18:
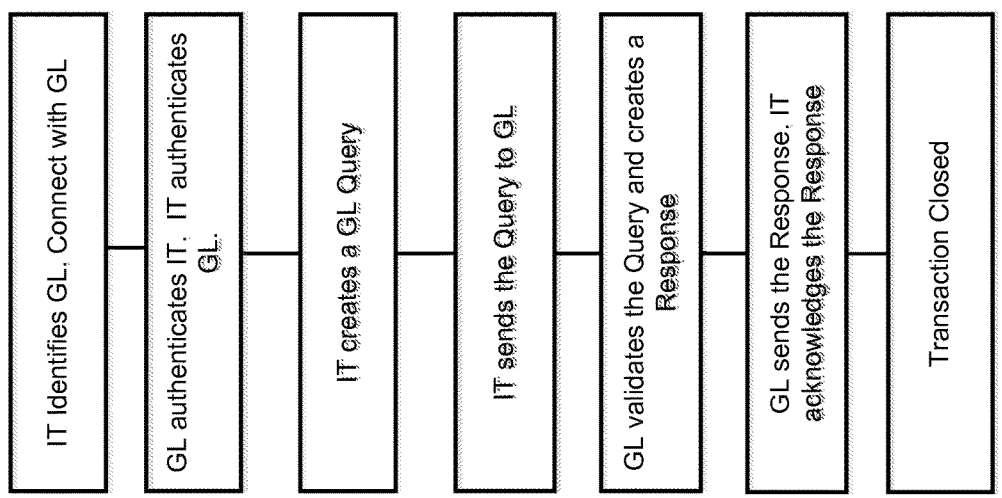
FIG. 18 is a representative flow diagram of General Ledger query and response.

In step:018, the Trusted component 500.2 may send the Coin unique ID (or Signature) and other information related to the Coin 300 to the Wallet Service application 604.2 using the already existing secure encrypted channel. Wallet Service application 604.2 identifies the General Ledger 800, authenticates itself and establish a secure and encrypted communication at step:040. At step:040, Wallet Service application 604.2 sends the Coin ID via transaction structure as described in FIG. 16a, and receives a response back as described FIG. 16b. Transaction structures 16a and 16b are example implementations. In this embodiment, the GL 800 may respond as to whether the Coin is active, and the identity of the Issuing Trust of the Digital Coin 300. In some embodiments, GL 800 has only the transaction related data; it may not have the owner or the Issuing Trusts of the coins. If the Issuing Trust of the received Coin is not known, GL 800 can connect with other ledger services and obtain information as to the owner of the Coin for the Wallet Service application 604.2, or the Wallet Service application 604.2 can contact other ledger services directly to find out the true owner of the Coin, or the Wallet Service Application 604.2 or the DW 500 can contact DW 400 and get this information.

If the Coin is not active in the GL 800, then the entire transaction is terminated. If the Coin is active in the GL 800, then the Issuing Trust 604's Wallet Service application 604.2 identifies the true owner (e.g., Issuing Trust 602) of the Coin 300, identifies its Wallet Service application 602.2, and the application 604.2 and the application 602.2 authenticate each other, and establish a secure communication at step: 022. Using this secure communication at step:022, the Wallet Service application 604.2 sends the Digital Coin Information 305 (or a subset thereof) to Wallet Service application 602.2 and verifies its value, ownership and its intent for transfer. At step:022, Wallet Service application 602.2 confirms the ownership of the Digital Coin 300, its value, and may share the Trust Policy and the Signature of the Digital Coin 300. The Wallet Service application 604.2 may additionally verify the Coin using Trust Policies and Signatures.

Issuing Trust 602 may make sure the recipient Wallet 500 is the right (intended) Wallet. The IT 602 may communicate with its customer's Wallet's Trusted Component 400.2 at step:040 and ensure that a transaction is intended for the Coin 300. Using public key cryptography, the Wallet Service application 602.2 confirms the true recipient (in this case, the trusted component 500.2) via steps 022 and 018. Once the confirmation is made, the Wallet Service application 602.2 locks the corresponding record in the GL 800 and sends an acceptance of the transaction to the Wallet Service application 604.2 via step:022. This lock can be a simple transfer entry of the Coin in the General Ledger 800. Wallet Service application 604.2 may generate a new Coin 303 from the old Coin 300 with equivalent value to that of the old Coin 300, send the Digital Coin 303 to the Trusted Component 500.2 via step:018, update the General Ledger 800 via step:026, and sends the acknowledgement to Wallet Services application 602.2 via step:022. Trusted Component 500.2 receives the new Digital Coin 303 via step:018, updates its Wallet 500 and internal ledgers at steps 012 and 016 and sends acknowledgement to Trusted Component 400.2 via steps 009 or 008. To complete the loop, Wallet Service application 602.2 can also send an acknowledgement to Trusted Component 400.2 via step:040. Wallet Service application 602.2 may instruct Trusted Component 400.2 to delete the Coin from its Wallet as the transaction is closed.

Figure 10B:
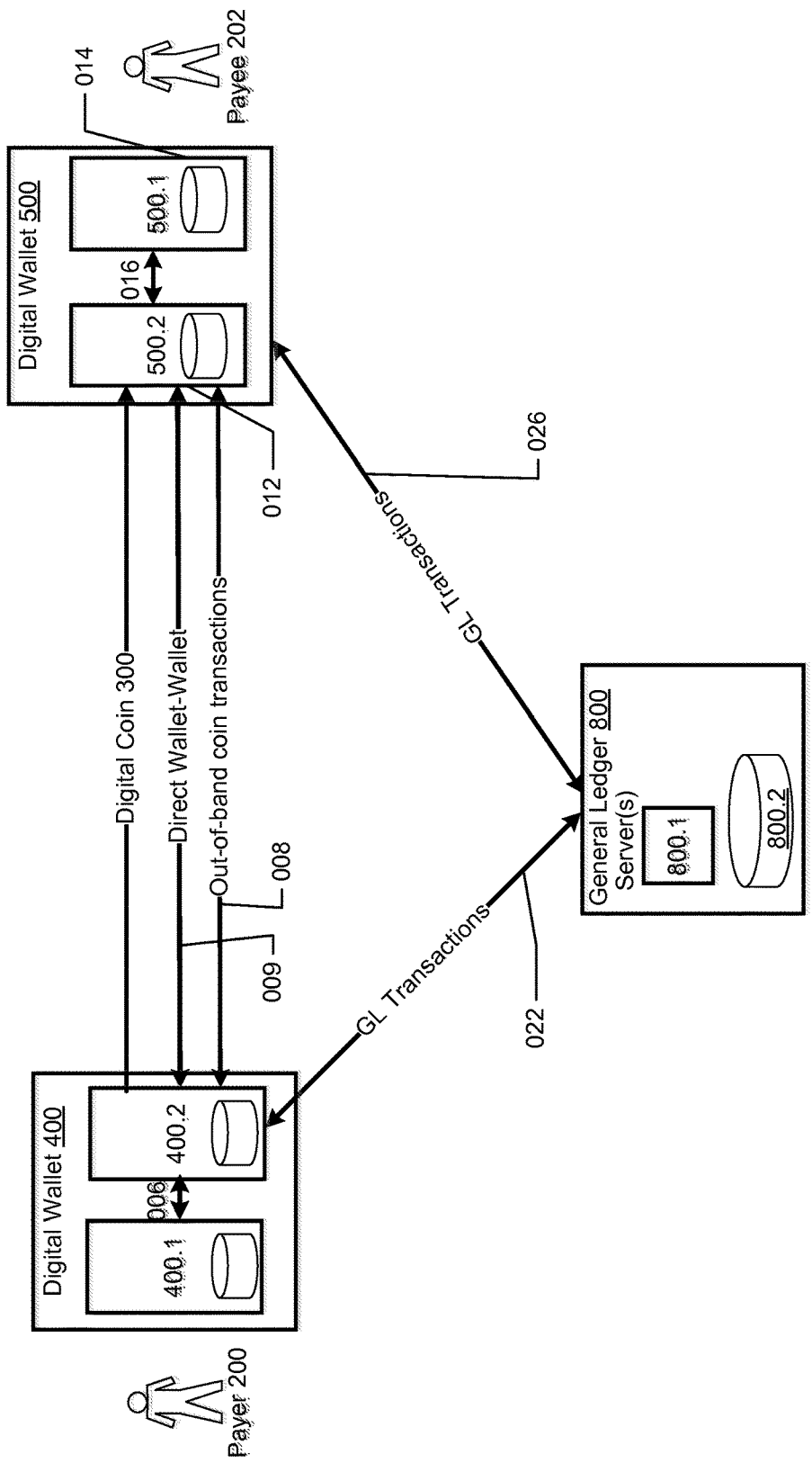

In another embodiment, Trusted Components 400.2 and 500.2 can replace the Wallet Service applications 602.2 and 604.2, respectively and can directly connect with the General Ledger 800 and can close the transaction as described in FIG. 10b. In this embodiment Trusted Components 400.2 and 500.2 can work with their respective Issuing Trusts for Digital Coin Operation and for other Services.

Figure 10C:
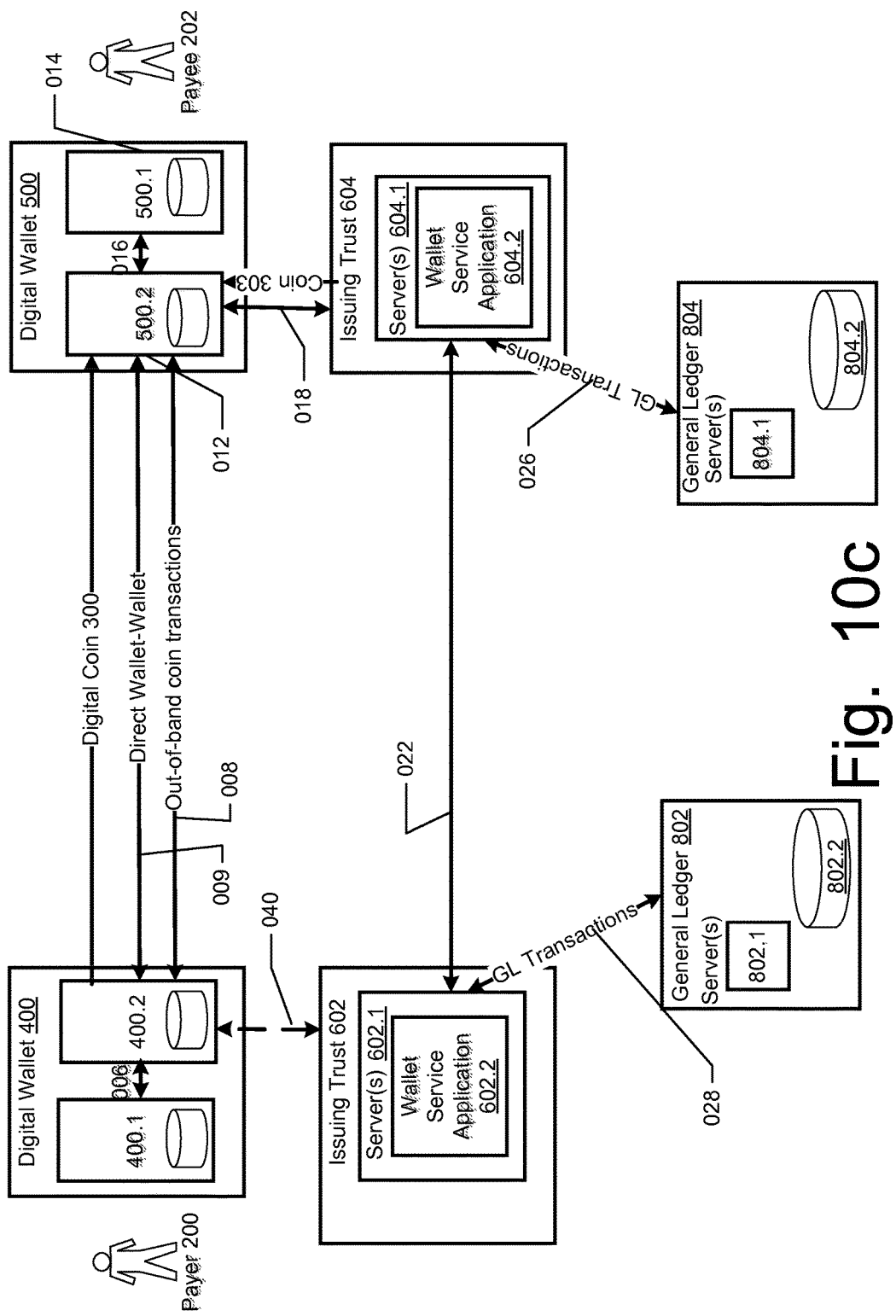

FIG. 10c describes another embodiment in which Issuing Trust 602 has its own GL 802 and Issuing Trust 604 has its own GL 804. In this case both GLs 802 and 804 may or may not be synchronized. Since each Digital Wallet is associated with an Issuing Trust transactions and Coin operations associated with the Wallets can be recorded by the Issuing Trust, and the recorded information may be a subset of the actual information that is used to verify a transaction. In this example, Issuing Trust 604 can query Issuing Trust 602 regarding the Coin 300. Issuing Trust 602 can verify its GL 802 via step: 028 and respond to Issuing Trust 604. In this embodiment GL 802 may have transactions and operations associated with the Wallets that are associated with (under the management of) the Issuing Trust 602. In the same respect, GL 804 may have transactions and operations associated with the Wallets that are associated with (under the management of) the Issuing Trust 604. Further, GLs 802 and 804 need not be synchronized and yet the transaction will complete because Issuing Trusts 602 and 604 can verify transactions on behalf of each other.

In another embodiment, DW 400 and DW 500 may have a common Issuing Trust. In this case, step:022 of FIG. 10a can be an internal communication (with respect to the issuing trust) and Digital Coin 300 may be used directly for Digital Coin 303 since both Wallets shares a common Issuing Trust. But DW 400 and DW 500 may have different Trust Policy requirements. So a new Digital Coin 303 may be generated irrespective of whether the Wallets share a common Issuing Trust or have different Issuing Trusts.

Figure 11:
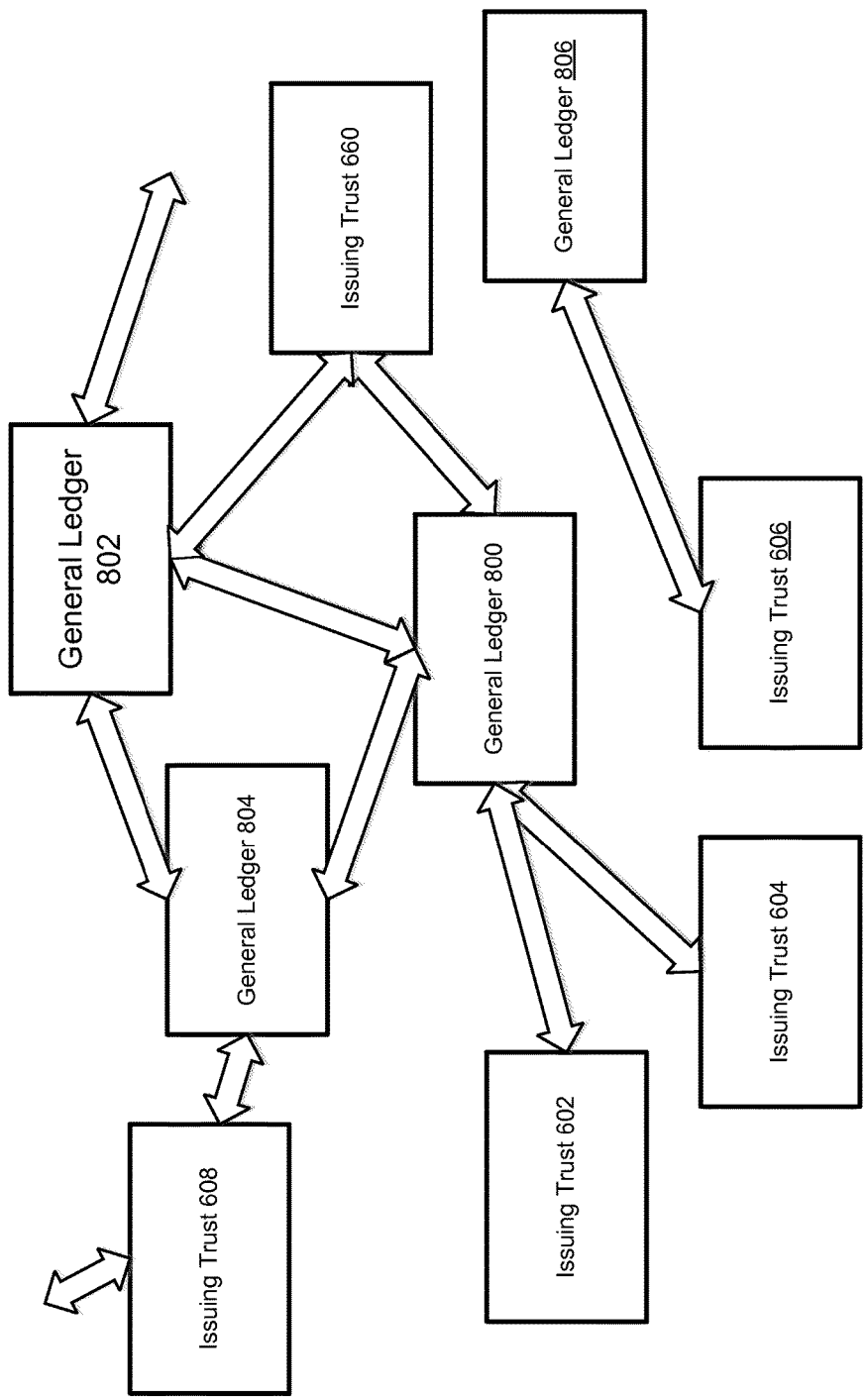
FIG. 11 is a representative block diagram of General Ledger and Issuing Trust interaction
Figure 14:
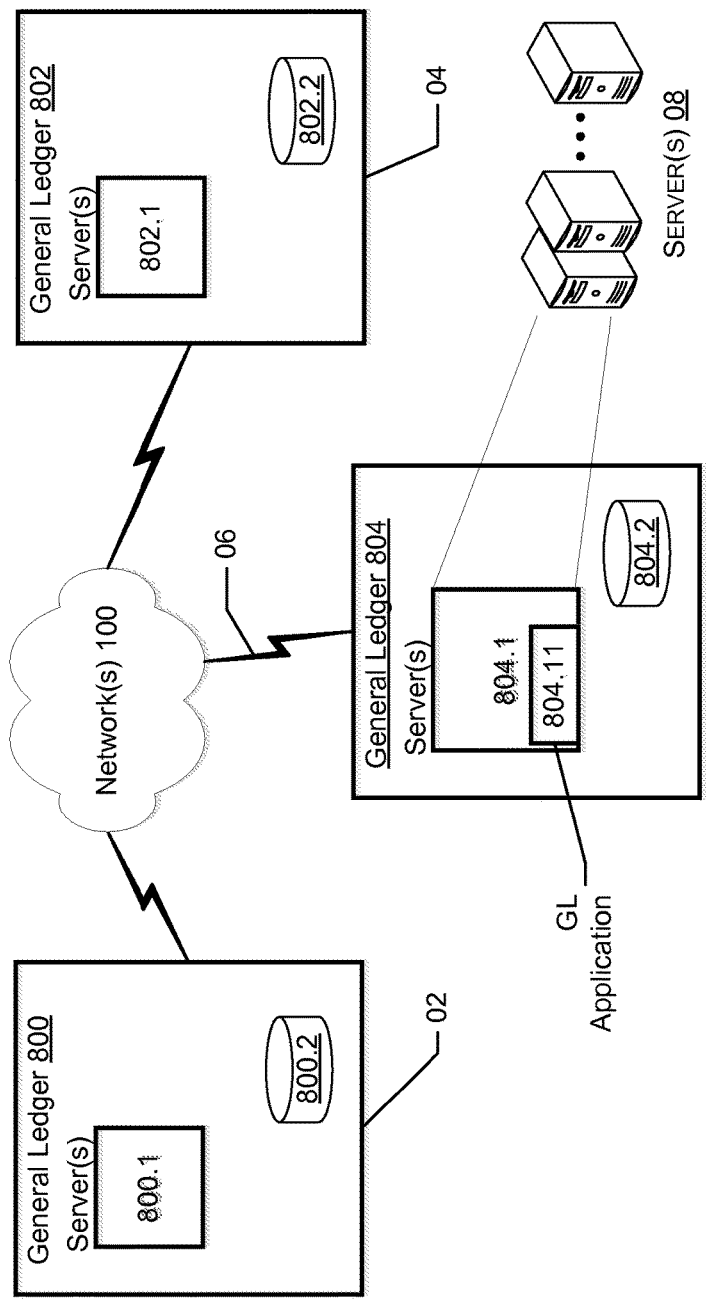
FIG. 14 is representative block diagram that represents the distributed nature of Digital Ledger

General Ledgers: The techniques and systems described herein may be implemented in a number of ways. Example implementations are provided below with reference to the following figures: FIG. 11, FIG. 14, FIG. 15a, FIG. 15b and FIG. 15c General Ledger 800 can be an Issuing Trust and can be a single ledger used by all Issuing Trusts or multiple ledgers used by the Issuing Trusts in a distributed architecture as described in FIG. 11. A GL 800 can also be part of the Issuing Trusts' own server infrastructure. FIG. 14 describes the distributed nature of the General Ledger. General Ledgers 800, 802, 804 . . . 80(x) may synchronize themselves and have consistent record set so that fraud is avoided. When a General Ledger query is received at a General Ledger, the query may be distributed to all general ledgers in the network; within nanoseconds correct response is built and sent back to the Issuing Trust. Further, other General Ledgers may be updated with a response immediately so that they have a consistent record base. FIG. 11 describes another embodiment in which a GL 806 is connected with an Issuing Trust 606 but not synchronized with other General Ledgers.

FIG. 14 describes an example of the General Ledger. A General Ledger may be an Issuing Trust that provides a GL service. It may have a set of servers (08) and set of communication protocols (06) to connect with Issuing Trusts to receive queries and respond to the queries, as well as set of protocols at (06) to synchronize with other General Ledgers. The Data Base 804.2 is a database that may contain, among other things, actual GL records of Digital Coin Transactions with information that will enable the Digital Wallets and Issuing Trusts to verify a transaction, and verify the status of the coin without identifying the user or the nature of the transaction.

Figure 15A:
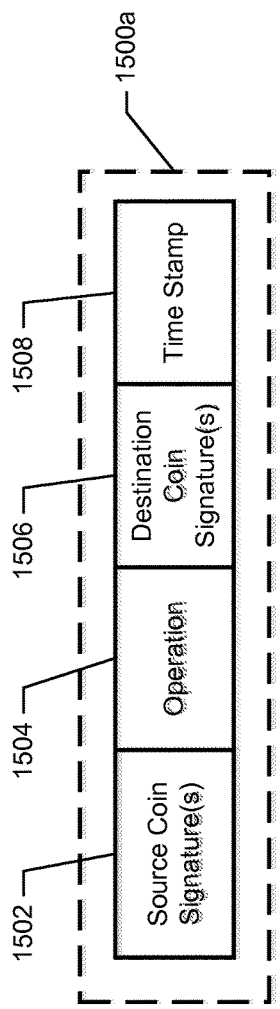
FIG. 15a, FIG. 15b, FIG. 15c are representative block diagrams of General Ledger record structure
Figure 15B:
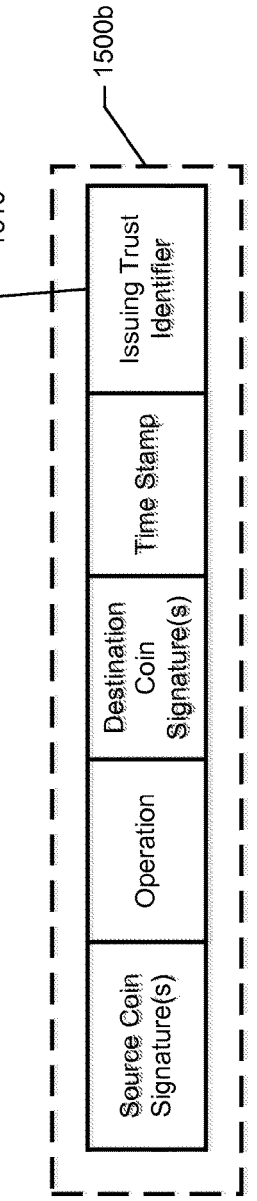
Figure 15C:
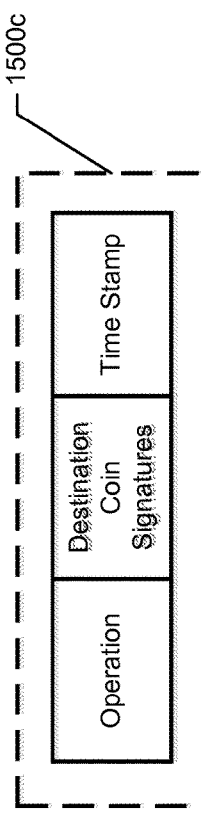

FIG. 15a, FIG. 15b, and FIG. 15c are various examples of a GL record that can be managed by the GL database 804.2 of FIG. 14. A person skilled in the art will understand any amount of information can be added to a GL record so that it can be retrieved at a future date to verify a transaction or validate the existence of the coin. The transaction can also exclusively have the operation and the coin without the timestamp.

FIG. 15a describes a typical implementation of the GL record 1500a. The GL record 1500a has the source Coin Signature 1502, a most recent operation 1504 applied to the Coin, the resultant Coin Signature 1506, and the Time Stamp 1508. In FIG. 15b, the GL record 1500b additionally has the Issuing Trust 1510 that was responsible for the operation 1504. In FIG. 15c, the GL record 1500c exclusively has an operation, and a Coin Signature with a timestamp. GL 800 can directly use the Coin Signatures when recording the transaction. Alternatively GL 800 can have another One Way Hash on the Coin Signature OWH (Coin Signature), encrypt it again, and store them in these records. In FIG. 15a 1502 represents Source Coin Signature directly or Encrypt(OWH (Source Coin Signature)) or another identifier that uniquely represents the Coin This applies to Destination Coin Signatures 1506 also.

In FIG. 15a 1504 represents various operations that can be performed on the coin. The techniques and systems described herein may be implemented in a number of ways. Example operators (case and the actual name does not matter) are provided hereby to explain the implementation. FIG. 15a is used as reference.

| | | |
|---|---|---|
| Generate | A new coin (1506) is generated from an old coin (1502). An Issuing Trust can also generate a Digital Coin from a physical currency or from a Bank Account. In this case, there is no Source Coin Signature (1502). Entry 1502 will be blank in FIG. 15a | Generate can create a new coin of same value from an old coin, and can also generate multiple coins whose resultant value is same as the old coin, or merge multiple coins to form a new coin of resultant value same. |
| Merge | Multiple Coins (1502) can be merged into a new Coin (1506). The resulting value is same | |
| Split | Coin (1502) can be split into multiple Coins (1506). The resulting value is same | |
| Delete | A Coin (1502) is deleted (or removed). But its value is still intact in another form. The new value will exists as a physical cash, or deposited/attached to a Bank Account, or transformed to a new coin | Generate, Merge, and Split can Delete old coins automatically. Delete can delete a coin but it can't remove it from circulation since the coin's value is not destroyed, it is still in the economy in some other form |
| Transfer | A Coin (1502) is transferred to another Wallet or another form. Or Coin (1506) is transferred from another Wallet or from another form | |
| Create | A new coin is generated from Nil. The resulting value is not the same. This can be done only by the Root Trust or by an authorized Issuing Trust | |
| Destroy | A coin's value is completely deleted from the circulation (or economy). This can be done only by the Root Trust or by an authorized Issuing Trust. | |

Example Coin Operations: Using the above operations any sets of coins can be transitioned to another set of coins. For example: The value of Coin-1 is $17.50; Coin-2 is $32.50. A payer 200 desires to give $20 to a friend (payee 202). The payer 200's Wallet is to generate a $20 coin, say Coin-3 and will keep a $30 coin (Coin-4) as remaining in his wallet.

This can be done via simple set of operations as described below as examples: Coin-1, Coin-2<merge> Coin-temp. Coin-temp <split> Coin-3, Coin-4. In this case, Coin-temp will have value of $50. Coin-3 will have a value $30 and Coin-4 will have a value of $20. Instead of merge and split operators, generate can be used as follows: Coin-1, Coin-2<generate> Coin-temp. Coin-temp <generate> Coin-3, Coin-4.

Example GL entries as described in FIG. 15a will look like the following:

| | | | |
|---|---|---|---|
| Coin-1 signature, Coin-2 signature | generate | Coin-temp signature | <timestamp> |
| Coin-temp signature | generate | Coin-3 signature, Coin-4 signature | <timestamp> |

Example GL entries as described in FIG. 15b will look like this

| | | | | |
|---|---|---|---|---|
| Coin-1 signature, Coin-2 signature | generate | Coin-temp signature | <timestamp> | IT identification |
| Coin-temp signature | generate | Coin-3 signature, Coin-4 signature | <timestamp> | IT identification |

Example GL entries as described in FIG. 15c will look like this

| | | |
|---|---|---|
| delete | Coin-1 Signature, Coin-2 Signature | <timestamp> |
| generate | Coin-temp Signature | <timestamp> |
| delete | Coin-temp Signature | <timestamp> |
| generate | Coin-3 Signature, Coin-4 Signature | <timestamp> |

In an embodiment, the General Ledger may have a record of Coin-1, Coin-2, Coin-temp, Coin-3, and Coin-4. Coin-1, Coin-2, Coin-temp are deleted from the system and Coin-3 and Coin-4 are active in the system.

Another approach of these operations can be: Coin-1, Coin-2<merge> Coin-temp <split> Coin-3, Coin-4. Another approach can be: Coin-1, Coin-2<merge><split> Coin-3, Coin-4. The resulting value after the operation is same ($50)—now the payer 200 can give $20 to a friend (payee 202) and the payer 200 can keep $30 in his Wallet. In these models, Coin-3 and Coin-4 are newly generated with new unique IDs. An Issuing Trust can generate these new coins as long as the resulting value is same. A Wallet can maintain one coin (which is the account balance of the wallet) and can split a coin whenever he/she need it. For example Bob has $5000 in his Wallet and it may be represented by one Coin.

He goes to a store and purchases an item for $45. At the cash register, Bob uses his mobile phone to pay for the transaction. The Wallet splits his coin into two coins with values $45 and $4955 by working with the Wallet's IT. Bob's Wallet transfers $45 to the Wallet associated with the store or the cash register (point of sale terminal), and Bob's Wallet keeps the remaining newly generated coin of $4955 in its secured storage.

General Ledger 800 manages the GL database 800.2 and serves the Issuing Trusts 602 and 604 (refer FIG. 10a) for updating the GL records or querying the GL records. GL servers and databases maintain anonymous transaction information and serve the Issuing Trusts 602 and 604. As described in FIG. 10c, GLs 802 and 804 can be managed independently by the Issuing Trusts 602 and 604, respectively. In this embodiment, each Issuing Trust has its own General Ledger and transactions related to the Issuing Trust and its Wallets are recorded in this General Ledger. In addition, FIG. 11 describes another example of a structure of the relationship among Issuing Trusts and General Ledgers.

An example coin transaction with an Issuing Trust using FIG. 9b: For example, a customer Bob (Payee 202) wants $100 Digital Coin from his bank account. The Bank (Issuing Trust 604) manages Bob's bank account. Bob logs into his Digital Wallet and using the customer's User Component 500.1 of the Wallet 500. Bob enters his login ID and password of his account for the Bank 604. Using the secure channel in step:010 Bob and his Digital Wallet 500 are validated and a secure and encrypted communication channel is established between the Bank 604 (Issuing Trust 604) and the Digital Wallet 500. Bob using his User Component 500.1 reviews his bank account and request $100 Digital Coin from his account. Trusted Component receives this request via step:006 and sends this request to Issuing Trust 604 via step:010. Optionally a Public and Private Key pair for the Digital Coin 303 is generated and the public key for the Digital Coin 303 is sent to IT 604. Trusted Component 500.2 can generate a separate key pair for Digital Coin 303 or it can use its own Digital Wallet public key for this purpose. Adding a public key with the coin may enhance the security of the coin.

Figure 13:
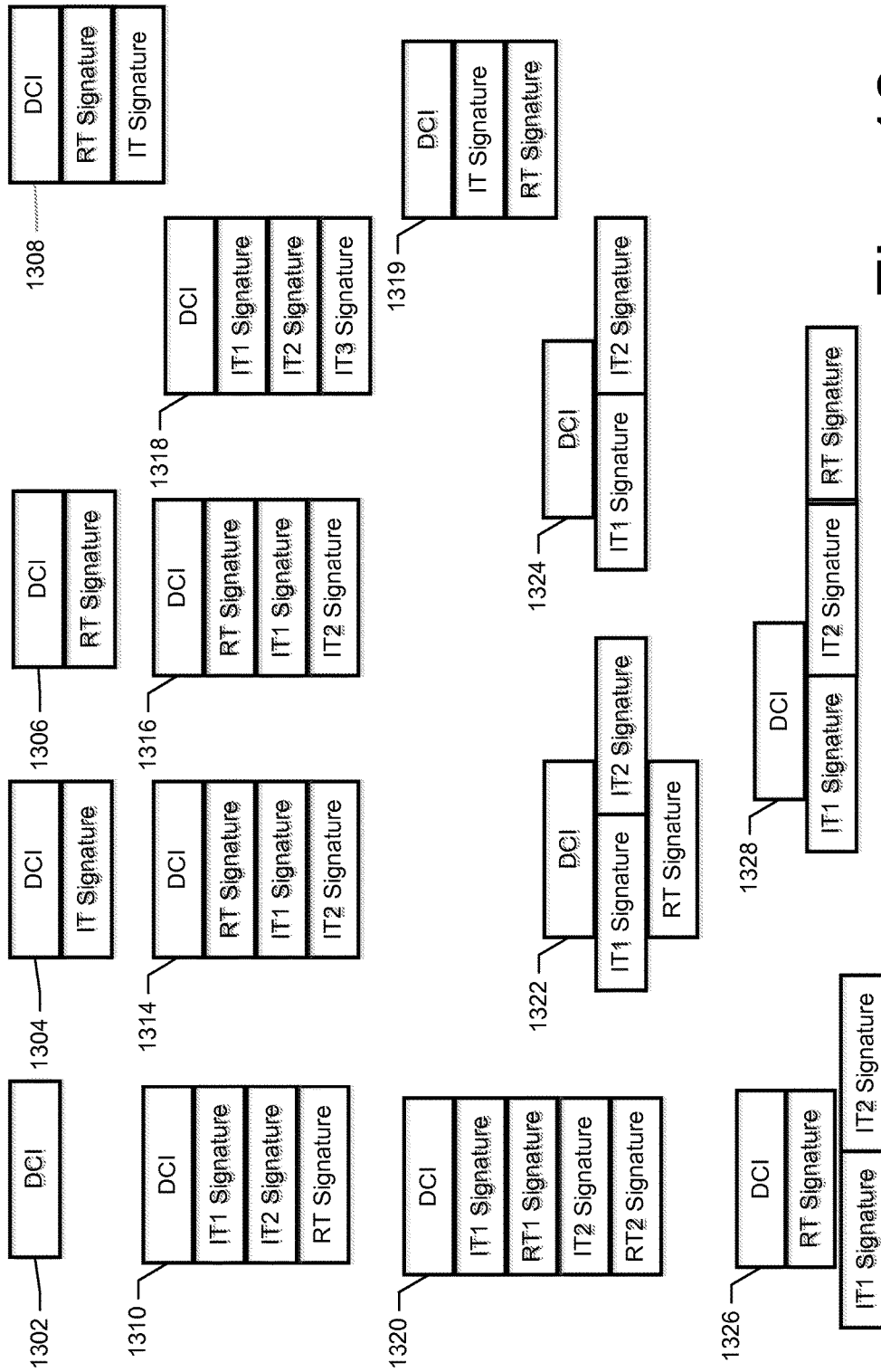
FIG. 13 contains block diagrams that represents various embodiments of Digital Coin Signature models

Wallet Service Application 604.2 receives this request, validates and authorizes the request and debit Bob's Bank Account for $100. An internal bank ledger entry is made for this transaction. IT 604 requests its Wallet 606 to create a $100 Digital Coin via step:012. Once the Digital Coin 303 is generated it can be sent via step:008 to 500.2 or alternatively it can be received by the IT via step:012 and sent to 500.2 via step:010. Wallet Service 604.2 creates, Digital Coin Info for the requested amount with a Trust Policy for the Coin 303 and sends it to 606.2 via step: 012. The Trusted Component 606.2 of the IT 606 now generates a new Digital Coin 303 worth $100 with the Digital Coin Information as described in FIG. 12a. Based on the Trust and Signature Policy it generates the Signatures of the coin. It can be simply IT 604's Signature or it can be a chain of multiple Signatures one top on another as described in FIG. 13 and FIG. 9a. If Root Signature is required then RT's Signature is added to the Digital Coin Information. This signature chain continues as per the policy of the Digital Coin 303. Chain of signatures can be built on top of each other to make the trust stronger. FIG. 13 describes various example models of the signature policy. In FIG. 13 the acronym DCI is used in the figures to refer Digital Coin Information that will be signed by the Trusts. In FIG. 13 figures 1302, 1304, 1306, 1308, 1310, 1314, 1316, 1318, 1319, and 1320 describe various examples of hierarchical signature models. FIGS. 1324 and 1328 describe examples of horizontal signature models. FIGS. 1322 and 1366 describe combination of hierarchical and horizontal signature models. Once the Signatures are in place IT 604 sends the Digital Coin 303 Information along with other Signatures to 500.2 to get Wallet 500's Signature. IT 604 now verifies the Signatures including Wallet 500's Signatures on top of the other Signatures. IT 604 stores this Digital Coin Signature and propagates that Signature to its other system components for transaction records management. Once the signature process is complete Issuing Trust updates the General Ledger with a 'generate' entry for Digital Coin 303. It sends the GL generate request to GL 800 for update via step: 022. GL 800 will have a record in its database such as:

| generate | <coin 303 signature> | <timestamp> | <IT 604 ID> |
|---|---|---|---|

In one embodiment IT 604 ID may be the public key of the Issuing Trust 604. Once GL is updated, Issuing Trust 604 informs 606.2 and sends the completed Coin 303 with its acknowledgement to 500.2. Trusted Component 500.2 receives Digital Coin 303 and stores the Coin in its database and informs the User Component 500.1 via 006. Now the GUI at 500.1 will show the existence of Digital Coin worth $100 in its database.

In one embodiment 500.1 will have record like this:

| ID (optional) | Coin Signature | Value | Universal Timestamp |
|---|---|---|---|
| 1 | <signature of coin 303> example: xyak879 | 100 | <universal date and time stamp> |

This end user ledger record may additionally have other information that describes the transaction. Example of the additional information may include: 1. how and from whom it acquired the Coin and 2. A subset of Digital Coin Information that be shown to the user.

In one embodiment, 500.2 may have the Digital Coin Info, Signatures of the Issuing and Root Trust, Coin Signature, and other transaction related data in its database. If the Coin is active in the GL and someone challenges the ownership of the Coin then 500.2 can produce the Signatures and prove its ownership of the Coin.

In one embodiment, IT 604 will have the internal Bank account ledger with a transaction record of $100 debit with the Signature of the Coin it issued for that debit. Further, IT 604 will have a separate coin transaction database where all records of the Coins it issued along with other operations is maintained. In one embodiment this record in the coin transaction database 604.6 is a superset of a GL record. It additionally may contain Trust and Signature policies, public key of the Coin, Signature of the Coin and timestamp. In some embodiments, it may also contain the value of the Coin.

In one embodiment, the database at 606.2 will have details of the Coin generation request, Coin signature, Timestamp, Trust Signatures with Timestamps and other transaction related information. Consider another example. Let Bob has a $100 coin and wants to make a payment of $30 to Alice. Bob's Trusted Component 500.2 sends the $100 Coin identifiers and may be with the Coin Signatures to IT 604 via secure channel at step:010 to IT 604. IT 604 immediately locks the coin in GL so that 500.2 can't transfer that coin simultaneously to the other user. Locking is to avoid double spending of the Digital Coin. In one embodiment it can be a transfer entry made in GL so that DW 500 can't use the coin any more. This coin is re-transferred and regenerated with two new coins as described below.

IT 604 may verify the signatures and it may send this information to all other ITs and RTs in the policy to verify their signatures. Once signatures are verified IT 604 approves the Digital Coin split request. After this, it will request 606.2 to generate two new Coins worth $30 and $70 with given policies. Once the new Coins are generated and Trust Signatures are made the new Coins are sent to 500.2. IT 604 informs 500.2 to delete the original Coin that is worth $100. A GL entry is made in GL 800 for a split and the lock is removed for the original coin. In one embodiment removing the lock can be done by using another transfer entry. If 500.2 does not delete the old Coin it is not an issue. If the Digital Wallet 500 is trying to reuse the coin, the GL entry for the split will invalidate this coin. In theory the original coin worth $100 is removed from circulation. The GL entry will look like this:

| <old coin $100 signature> | transfer | | <timestamp> | <IT Identification> |
|---|---|---|---|---|
| | transfer | <old coin $100 signature> | <timestamp> | <IT Identification> |
| <old coin $100 signature> | generate | <new coin $30 signature>, <new coin $70 signature> | <timestamp> | <IT Identification> |

Now the Trusted Component will keep the $70 Digital Coin in its secure storage and send the $30 coin to Alice as discussed earlier. These table entries and the following table entries discussed herein have some example entries with random alpha numeric strings for coin signatures and coins, and numbers for values. These are randomly created examples to demonstrate the coin operations.

As another example of Wallet to Wallet money transfer we can discuss the above scenario with FIG. 10c. Let us assume that Payer 200 wants to send $30 to Payee 202. The Payer will use the user component 400.1 to look at his wallet balances. In one example it will look like this:

| ID (optional) | Coin (optional data about the coin) | Signature of the coin | Value | Universal Timestamp |
|---|---|---|---|---|
| 1 | sadasldkjaslkdasld | xyak879 | 100 | <universal date and time stamp> |
| 2 | sldasdajsdlhjyk123 | 890yuo | 100 | <universal date and time stamp> |
| 10 | Sldasdad3jsdlhjyk1 | jkh789 | 100 | <universal date and time stamp> |

Payee 200 selects Payee 202 from his address book (not shown in Figures) and requests the Digital Wallet 400 to send $30 to Payee 202. The Trusted Component 400.2 communicates with Issuing Trust 602 and its Wallet Service 602.2 and splits the Coin xyzk879 into two Coins one worth $30 and another worth $70. The User Component 400.1 may have coin table like this:

| | 2 | sldasdajsdlhjyk123 | 890yuo | 100 | <universal date and time stamp> |
|---|---|---|---|---|---|
| 10 | sldasdajsdlhjyk123 | jkh789 | 100 | <universal date and time stamp> |
| 11 | Xljkand23w | Xyzj8756 | 30 | <universal date and time stamp> |
| 12 | Asd35sdg | Paquf678 | 70 | <universal date and time stamp> |

In the above table, at record entry 1, the coin xyak879 is deleted. Alternatively, the coin xyak879 still can exist as a record in the User Component table (and/or in the Trusted Component Tables) but it is marked as deleted with reasons, resulting coins and timestamp to maintain historical transaction records. Further, two new Coins Xyzj8756 and Paquf678 with total value of $100 are generated at entries 11 and 12. And the GL 802 may have an entry like this:

| Unique Info (generally signature of the cash) | Operation | Resulting coin unique info | Universal Timestamp (e.g., GMT) |
|---|---|---|---|
| xyak879 | generate | Xyzj8756, Paquf678 | <universal date and time stamp> |
| | generate | xyak879jkh789 | <universal date and time stamp> |
| | generate | 890yuo | <universal date and time stamp> |
| | generate | xyak879 | <universal date and time stamp> |

Now 400.2 sends the Coin Signature Xyzj8756 and the IT 602 public key (it also can be any unique identification of the IT 602) to 502.2 via the secure channel at step: 009. Optionally, 400.2 informs its Issuing Trust 602 (and/or GL 802) about this transfer. GL 802 marks this transfer and the ledger may have an additional entry like this:

| Unique Info (generally signature of the cash) | Operation | Resulting Unique info | Universal Timestamp (e.g., GMT) |
|---|---|---|---|
| Xyzj8756 | transfer | | <universal date and time stamp> |

This entry can be made immediately or once IT 604 accepts and confirms the transfer. 500.2 receives the Coin signature Xyzj8756 and IT 602's public key from 400.2 and sends them to IT 604 for validation. IT 604 establishes a secure communication with IT 602 and validates the coin. IT 602 validates whether the receiver Digital Wallet 500 is the right recipient of the coin Xyzj8756. IT 604 may mark an entry into its GL 804 with a following entry:

| Unique Info (generally signature of the cash) | Operation | Resulting Unique info | Universal Timestamp (e.g., GMT) |
|---|---|---|---|
| | transfer | Xyzj8756 | <universal date and time stamp> |

IT 604 asks its Wallet (shown in the FIG. 9) to create a new coin worth $30. GL may have an additional entry like this:

| Unique Info (generally signature of the cash) | Operation | Resulting Unique info | Universal Timestamp (e.g., GMT) |
|---|---|---|---|
| Xyzj8756 | generate | hjklaoi | <universal date and time stamp> |

IT 604 transfers this coin and the associated Signatures to 500.2. Trusted Component 500.2 receives this coin and stores it in its secure coin database and informs 500.1 via step: 016. 500.1 will have an entry like this in its ledger.

| <Serial number> | Sadasl2dkjaslkdasld | hjklaoi | 30 | <universal date and time stamp> |
|---|---|---|---|---|

Coin xyak879 (worth $100) is now deleted and DW 400 cannot use it any more. Coin Xyzj8756 (worth $30) is also deleted and DW 400 can't use it any more. Coin hjklaoi (worth $30) is newly generated and is available for DW 500 to use. Coin Paquf678 (worth $70) is also available in DW 400.

Proving Ownership of a Coin: We can use FIG. 9b's example implementation to describe this section. Digital Wallet 500 owns Digital Coin 303. If someone challenges the ownership, the ownership of the Coin can be proved in multiple ways. First one needs to verify in the General Ledger for the existence of the Coin with the Coin identifiers for Coin 303. If Coin 303 is still active DW 500 will produce the Coin Information with all the Trust Signatures to the Receiving Digital Wallet (say 502).

a. DW 502 verifies the Digital Coin Integrity by taking its public key and decrypts the signature to receive a Hash.
 b. DW 502 builds the new Hash from the given data. If both Hashes are the same then the public key is the right key of the coin.
 c. It proves that the owner of the corresponding private key is the owner of the coin.
 d. DW 502 can create a random text and encrypt using the public key and then send it to Digital Wallet 500
 e. If DW 500 reveals the random text then 500 is the true owner of the private key and the true owner of the coin.

The second important verification is to check with IT 604 as to whether IT 604 generated the coin 303. Since IT 604 maintains coin records, IT 604 can provide necessary details of ownership. Further, if someone wants to verify the validity of all the signatures they can traverse back to Issuing Trusts including the Root Trusts as per the policy and verify the signatures and their records. The GL proves the existence of the coin in circulation. Coin Signature will prove the integrity and ownership of the coin. Trust Signatures will prove the validity of the coin.

International Transactions: This invention as described provides a seamless mechanism for international transfer across the border of Digital Coins. In FIG. 10a, as an example, Payer 200 lives in the US, transacts in US dollars and also wants to send $100 to Payee 202 who lives in India for services the Payee offered. Issuing Trust 400.2 will send a Digital Coin 300 worth US$100 to the Payee. Payee will process the Digital Coin 300 in the same way it was discussed in the earlier sections. But when Issuing Trust 604 generates a new Digital Coin 303 it will be in Indian Rupee units of equivalent value as determined by the exchange rates at that time. The above example is one example embodiment. Other examples include: Digital Wallet 400 directly creates a new Coin in Indian Rupee of equivalent value and sends that new Coin to Digital Wallet 500; Digital Wallet sends the coin to an intermediary and the intermediary creates a new Digital Coin in India Rupee of equivalent value and sends the new Coin to Digital Wallet 500. The above examples demonstrate that conversion of value can happen at any stage in the transaction. The General Ledger can be a common Ledger as described in FIG. 10a or it can be separate ledgers as described in FIG. 10c. Mutual Authentication of Issuing Trust 602 and 604 can be done or it can be several levels above until the Root Trust level. For example, if the Coin is issued by a Bank 602 in USA and IT 604 is a Bank in India. These two Banks can trust each other based on the level of information they have, otherwise the Trust verification can go up to the Federal Reserve in the US and Reserve Bank Of India (RBI) in India. This entire model with various examples of implementation will naturally take care of international financial transactions. Further, this invention describes a jurisdiction as determined by the Issuing Authorities and does not limit the unit of the currency to a jurisdiction. So an Issuing Trust can deal with multiple units of currency or value. The value can be just reward points. For example, one Wallet can send 500 reward points to another Wallet. The receiving Wallet can receive a new Digital Coin worth 500 reward points; or 300 worth some other reward points (as an example); or it may receive a new Digital Coin Worth $5.

Financial Instruments: This model can be extended to support other Financial Instruments; examples include Checks, Cashier's Checks and Money Orders. The Coin Header (FIG. 12a; 302) field in Digital Coin Information 300 can contain the type, life, and other details of the Financial Instrument. The Financial Instrument can be in the Digital Wallet and can behave like Digital Coins. As described in FIG. 9b, A Digital Wallet 500 can communicate with its Issuing Trust 604 and generate a Financial Instrument against a Bank Account or a Digital Coin. Furthermore, DW can send a Financial Instrument to IT 604 and can generate a Digital Coin worth the same value. In all respects a Financial Instrument is a Digital Coin.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example One

A method comprising: sending, by a computing device, a request for a digital coin to an issuing trust; receiving, by the computing device and from the issuing trust, information associated with the digital coin, the information including a digital signature of the issuing trust, or of a different issuing trust; digitally signing, by the computing device, the information; and sending, by the computing device, the digitally signed information to the issuing trust.

Example Two

The method of Example One, wherein the request includes a unit of currency, a value, and a public key.

Example Three

The method of Example One, further comprising: receiving an acknowledgement from the issuing trust after sending the digitally signed information to the issuing trust; and storing the digitally signed information in storage of a trusted component of a digital wallet of the computing device.

Example Four

The method of Example Three, wherein the digital wallet further comprises a user component, and wherein the trusted component of the digital wallet is maintained within a shell application that provides separation of code running in the trusted component from other code running in the user component of the digital wallet.

Example Five

The method of Example Four, wherein the computing device is a server computing device, and wherein the shell application is maintained in the server computing device.

Example Six

The method of Example Four, wherein the shell application is created by the issuing trust.

Example Seven

The method of Example One, wherein the information associated with the digital coin further includes an identifier of the digital coin comprising at least one of a public key associated with the digital coin, or a one way hash of the public key.

Example Eight

The method of Example One, wherein the computing device comprises a mobile computing device.

Example Nine

One or more non-transitory computer-readable media storing computer-executable instructions that, when executed on one or more processors, perform operations comprising: sending a request for a digital coin to an issuing trust; receiving, from the issuing trust, information associated with the digital coin, the information including a digital signature of the issuing trust, or of a different issuing trust; digitally signing the information; and sending the digitally signed information to the issuing trust.

Example Ten

The non-transitory computer-readable media of Example Nine, wherein the request includes a unit of currency, a value, and a public key.

Example Eleven

The non-transitory computer-readable media of Example Nine, the operations further comprising: receiving an acknowledgement from the issuing trust after sending the digitally signed information to the issuing trust; and storing the digitally signed information in storage of a trusted component of a digital wallet.

Example Twelve

The non-transitory computer-readable media of Example Eleven, wherein the digital wallet further comprises a user component, and wherein the trusted component of the digital wallet is maintained within a shell application that provides separation of code running in the trusted component from other code running in the user component of the digital wallet.

Example Thirteen

The non-transitory computer-readable media of Example Twelve, wherein the shell application is created by the issuing trust.

Example Fourteen

The non-transitory computer-readable media of Example Nine, wherein the information associated with the digital coin further includes an identifier of the digital coin comprising at least one of a public key associated with the digital coin, or a one way hash of the public key.

Example Fifteen

A system comprising: one or more processors; memory; and one or more modules stored in the memory and executable by the one or more processors to perform operations comprising: sending a request for a digital coin to an issuing trust; receiving, from the issuing trust, information associated with the digital coin, the information including a digital signature of the issuing trust, or of a different issuing trust; digitally signing the information; and sending the digitally signed information to the issuing trust.

Example Sixteen

The system of Example Fifteen, wherein the request includes a unit of currency, a value, and a public key.

Example Eighteen

The system of Example Fifteen, the operations further comprising: receiving an acknowledgement from the issuing trust after sending the digitally signed information to the issuing trust; and storing the digitally signed information in storage of a trusted component of a digital wallet stored in the memory.

Example Nineteen

The system of Example Eighteen, wherein the digital wallet further comprises a user component, and wherein the trusted component of the digital wallet is maintained within a shell application that provides separation of code running in the trusted component from other code running in the user component of the digital wallet.

Example Twenty

The system of Example Nineteen, wherein the one or more processors and the memory reside in a server computing device, and wherein the shell application is maintained in the server computing device.

Example Twenty-One

The system of Example Nineteen, wherein the shell application is created by the issuing trust.

Example Twenty-Two

The system of Example Fifteen, wherein the information associated with the digital coin further includes an identifier of the digital coin comprising at least one of a public key associated with the digital coin, or a one way hash of the public key.

Example Twenty-Three

The system of Example Fifteen, wherein the one or more processors and the memory reside in a mobile computing device.

Example Twenty-Four

A method comprising: receiving, by at least one computing device of one or more computing devices, a request that includes at least a value; building, by at least one computing device of the one or more computing devices, information to be associated with a digital coin for the value of the request; obtaining, by at least one computing device of the one or more computing devices, a first signature associated with an issuing trust; adding, by at least one computing device of the one or more computing devices, the first signature to the information; sending, by at least one computing device of the one or more computing devices, the information with the first signature; receiving, by at least one computing device of the one or more computing devices, a second signature associated with a digital wallet; and updating, by at least one computing device of the one or more computing devices, a general ledger with a record entry for the digital coin.

Example Twenty-Five

The method of Example Twenty-Four, further comprising sending an acknowledgement in response to receiving the second signature associated with the digital wallet.

Example Twenty-Six

The method of Example Twenty-Four, wherein updating the general ledger comprises creating the record entry having at least a third signature associated with the digital coin and a timestamp.

Example Twenty-Seven

The method of Example Twenty-Six, wherein the record entry further includes an operation indicating that the digital coin has been generated.

Example Twenty-Eight

The method of Example Twenty-Four, wherein the general ledger comprises multiple general ledgers that are synchronized to maintain consistent records between the multiple general ledgers.

Example Twenty-Nine

The method of Example Twenty-Four, wherein obtaining the first signature associated with the issuing trust comprises obtaining multiple signatures from multiple issuing trusts.

Example Thirty

The method of Example Twenty-Nine, wherein a number of signatures to obtain is based at least in part on a trust policy.

Example Thirty-One

One or more non-transitory computer-readable media storing computer-executable instructions that, when executed on one or more processors, perform operations comprising: receiving a request that includes at least a value; building information to be associated with a digital coin for the value of the request; obtaining a first signature associated with an issuing trust; adding the first signature to the information; sending the information with the first signature; receiving a second signature associated with a digital wallet; and updating a general ledger with a record entry for the digital coin.

Example Thirty-Two

The non-transitory computer-readable media of Example Thirty-One, the operations further comprising sending an acknowledgement in response to receiving the second signature associated with the digital wallet.

Example Thirty-Three

The non-transitory computer-readable media of Example Thirty-One, wherein updating the general ledger comprises creating the record entry having at least a third signature associated with the digital coin and a timestamp.

Example Thirty-Four

The non-transitory computer-readable media of Example Thirty-Three, wherein the record entry further includes an operation indicating that the digital coin has been generated.

Example Thirty-Five

The non-transitory computer-readable media of Example Thirty-One, wherein the general ledger comprises multiple general ledgers that are synchronized to maintain consistent records between the multiple general ledgers.

Example Thirty-Six

The non-transitory computer-readable media of Example Thirty-One, wherein obtaining the first signature associated with the issuing trust comprises obtaining multiple signatures from multiple issuing trusts.

Example Thirty-Seven

The non-transitory computer-readable media of Example Thirty-Six, wherein a number of signatures to obtain is based at least in part on a trust policy.

Example Thirty-Eight

A system comprising: one or more processors; memory; and one or more modules stored in the memory and executable by the one or more processors to perform operations comprising: receiving a request that includes at least a value; building information to be associated with a digital coin for the value of the request; obtaining a first signature associated with an issuing trust; adding the first signature to the information; sending the information with the first signature; receiving a second signature associated with a digital wallet; and updating a general ledger with a record entry for the digital coin.

Example Thirty-Nine

The system of Example Thirty-Eight, the operations further comprising sending an acknowledgement in response to receiving the second signature associated with the digital wallet.

Example Forty

The system of Example Thirty-Eight, wherein updating the general ledger comprises creating the record entry having at least a third signature associated with the digital coin and a timestamp.

Example Forty-One

The system of Example Forty, wherein the record entry further includes an operation indicating that the digital coin has been generated.

Example Forty-Two

The system of Example Thirty-Eight, wherein the general ledger comprises multiple general ledgers that are synchronized to maintain consistent records between the multiple general ledgers.

Example Forty-Three

The system of Example Thirty-Eight, wherein obtaining the first signature associated with the issuing trust comprises obtaining multiple signatures from multiple issuing trusts.

Example Forty-Four

The system of Example Forty-Three, wherein a number of signatures to obtain is based at least in part on a trust policy.

Example Forty-Five

A method comprising: receiving, by at least one computing device of one or more computing devices, an instruction to update a general ledger; and updating, by at least one computing device of the one or more computing devices, the general ledger by creating a record for a digital coin, the record including an operator, information associated with the digital coin, and a timestamp.

Example Forty-Six

The method of Example Forty-Five, wherein the operator indicates a particular transaction associated with the digital coin.

Example Forty-Seven

The method of Example Forty-Five, wherein the general ledger comprises a first general ledger, the method further comprising synchronizing the record with a second general ledger.

Example Forty-Eight

The method of Example Forty-Five, wherein the digital coin comprises a destination digital coin, and wherein the record further includes information associated with a source digital coin.

Example Forty-Nine

The method of Example Forty-Five, wherein the information associated with the digital coin comprises a signature of the digital coin.

Example Fifty

The method of Example Forty-Nine, wherein the signature comprises an encrypted one way hash of the information associated with the digital coin.

Example Fifty-One

The method of Example Forty-Five, wherein the record further includes an identifier of an issuing trust.

Example Fifty-Two

One or more non-transitory computer-readable media storing computer-executable instructions that, when executed on one or more processors, perform operations comprising: receiving an instruction to update a general ledger; and updating the general ledger by creating a record for a digital coin, the record including an operator, information associated with the digital coin, and a timestamp.

Example Fifty-Three

The non-transitory computer-readable media of Example Fifty-Two, wherein the operator indicates a particular transaction associated with the digital coin.

Example Fifty-Four

The non-transitory computer-readable media of Example Fifty-Two, wherein the general ledger comprises a first general ledger, the method further comprising synchronizing the record with a second general ledger.

Example Fifty-Five

The non-transitory computer-readable media of Example Fifty-Two, wherein the digital coin comprises a destination digital coin, and wherein the record further includes information associated with a source digital coin.

Example Fifty-Six

The non-transitory computer-readable media of Example Fifty-Two, wherein the information associated with the digital coin comprises a signature of the digital coin.

Example Fifty-Seven

The non-transitory computer-readable media of Example Fifty-Six, wherein the signature comprises an encrypted one way hash of the information associated with the digital coin.

Example Fifty-Eight

The non-transitory computer-readable media of Example Fifty-Two, wherein the record further includes an identifier of an issuing trust.

Example Fifty-Nine

A system comprising: one or more processors; memory; and one or more modules stored in the memory and executable by the one or more processors to perform operations comprising: receiving an instruction to update a general ledger; and updating the general ledger by creating a record for a digital coin, the record including an operator, information associated with the digital coin, and a timestamp.

Example Sixty

The system of Example Fifty-Nine, wherein the operator indicates a particular transaction associated with the digital coin.

Example Sixty-One

The system of Example Fifty-Nine, wherein the general ledger comprises a first general ledger, the method further comprising synchronizing the record with a second general ledger.

Example Sixty-Two

The system of Example Fifty-Nine, wherein the digital coin comprises a destination digital coin, and wherein the record further includes information associated with a source digital coin.

Example Sixty-Three

The system of Example Fifty-Nine, wherein the information associated with the digital coin comprises a signature of the digital coin.

Example Sixty-Four

The system of Example Sixty-Three, wherein the signature comprises an encrypted one way hash of the information associated with the digital coin.

Example Sixty-Five

The system of Example Fifty-Nine, wherein the record further includes an identifier of an issuing trust.

Example Sixty-Six

A method comprising: receiving, by at least one computing device of one or more computing devices, an identifier of a first digital coin; validating, by at least one computing device of the one or more computing devices, the first digital coin based at least in part on the identifier; creating, by at least one computing device of the one or more computing devices, a second digital coin that is equal in value to the first digital coin; updating, by at least one computing device of the one or more computing devices, a general ledger with a record entry for the second digital coin; and sending, by at least one computing device of the one or more computing devices, the second digital coin.

Example Sixty-Seven

The method of Example Sixty-Six, wherein validating the first digital coin comprises: identifying the general ledger of the first digital coin; sending the identifier to the general ledger; identifying an issuing trust of the first digital coin; sending the identifier to the issuing trust.

Example Sixty-Eight

The method of Example Sixty-Seven, further comprising obtaining a signature associated with the issuing trust per a trust policy.

Example Sixty-Nine

The method of Example Sixty-Six, wherein the second digital coin is in a different unit of currency than a unit of currency of the first digital coin.

Example Seventy

The method of Example Sixty-Six, further comprising, prior to updating the general ledger, receiving a signature associated with a digital wallet.

Example Seventy-One

The method of Example Seventy, further comprising sending an acknowledgement in response to receiving the signature associated with the digital wallet.

Example Seventy-Two

The method of Example Sixty-Six, wherein updating the general ledger comprises creating the record entry having at least a first signature associated with the first digital coin, a second signature associated with the second digital coin, and a timestamp.

Example Seventy-Three

One or more non-transitory computer-readable media storing computer-executable instructions that, when executed on one or more processors, perform operations comprising: receiving an identifier of a first digital coin; validating the first digital coin based at least in part on the identifier; creating a second digital coin that is equal in value to the first digital coin; updating a general ledger with a record entry for the second digital coin; and sending the second digital coin.

Example Seventy-Four

The non-transitory computer-readable media of Example Seventy-Three, wherein validating the first digital coin comprises: identifying the general ledger of the first digital coin; sending the identifier to the general ledger; identifying an issuing trust of the first digital coin; sending the identifier to the issuing trust.

Example Seventy-Five

The non-transitory computer-readable media of Example Seventy-Four, the operations further comprising obtaining a signature associated with the issuing trust per a trust policy.

Example Seventy-Six

The non-transitory computer-readable media of Example Seventy-Three, wherein the second digital coin is in a different unit of currency than a unit of currency of the first digital coin.

Example Seventy-Seven

The non-transitory computer-readable media of Example Seventy-Three, the operations further comprising, prior to updating the general ledger, receiving a signature associated with a digital wallet.

Example Seventy-Eight

The non-transitory computer-readable media of Example Seventy-Seven, the operations further comprising sending an acknowledgement in response to receiving the signature associated with the digital wallet.

Example Seventy-Nine

The non-transitory computer-readable media of Example Seventy-Three, wherein updating the general ledger comprises creating the record entry having at least a first signature associated with the first digital coin, a second signature associated with the second digital coin, and a timestamp.

Example Eighty

A system comprising: one or more processors; memory; and one or more modules stored in the memory and executable by the one or more processors to perform operations comprising: receiving an identifier of a first digital coin; validating the first digital coin based at least in part on the identifier; creating a second digital coin that is equal in value to the first digital coin; updating a general ledger with a record entry for the second digital coin; and sending the second digital coin.

Example Eighty-One

The system of Example Eighty, wherein validating the first digital coin comprises: identifying the general ledger of the first digital coin; sending the identifier to the general ledger; identifying an issuing trust of the first digital coin; sending the identifier to the issuing trust.

Example Eighty-Two

The system of Example Eighty-One, the operations further comprising obtaining a signature associated with the issuing trust per a trust policy.

Example Eighty-Three

The system of Example Eighty, wherein the second digital coin is in a different unit of currency than a unit of currency of the first digital coin.

Example Eighty-Four

The system of Example Eighty, the operations further comprising, prior to updating the general ledger, receiving a signature associated with a digital wallet.

Example Eighty-Five

The system of Example Eighty-Four, the operations further comprising sending an acknowledgement in response to receiving the signature associated with the digital wallet.

Example Eighty-Six

The system of Example Eighty, wherein updating the general ledger comprises creating the record entry having at least a first signature associated with the first digital coin, a second signature associated with the second digital coin, and a timestamp.

Example Eighty-Seven

A method comprising: identifying, by at least one computing device of one or more computing devices, a general ledger; identifying, by at least one computing device of the one or more computing devices, an operation for a transaction associated with a digital coin; identifying, by at least one computing device of the one or more computing devices, information associated with the digital coin; and updating, by at least one computing device of the one or more computing devices, the general ledger by creating a transaction record for the digital coin, the transaction record including at least the operation and the information associated with the digital coin.

Example Eighty-Eight

The method of Example Eighty-Seven, wherein the operation comprises at least one of: a generate operation to generate one or more new digital coins that are equal in value to one or more old digital coins; a generate operation to generate one or more new digital coins that are equal in value to one or more financial instruments; a delete operation to delete the digital coin; a merge operation to merge one or more digital coins into the digital coin that is equal in value to the one or more digital coins; or a split operation to split the digital coin into one or more digital coins that are equal in value to the digital coin.

Example Eighty-Nine

The method of Example Eighty-Seven, wherein the general ledger comprises a first general ledger, the method further comprising synchronizing the transaction record with a second general ledger.

Example Ninety

The method of Example Eighty-Seven, wherein the digital coin comprises a destination digital coin, and wherein the transaction record further includes information associated with a source digital coin.

Example Ninety-One

The method of Example Eighty-Seven, wherein the information associated with the digital coin comprises a signature of the digital coin.

Example Ninety-Two

The method of Example Ninety-One, wherein the signature comprises an encrypted one way hash of the information associated with the digital coin.

Example Ninety-Three

The method of Example Eighty-Seven, wherein the transaction record further includes an identifier of an issuing trust.

Example Ninety-Four

One or more non-transitory computer-readable media storing computer-executable instructions that, when executed on one or more processors, perform operations comprising: identifying a general ledger; identifying an operation for a transaction associated with a digital coin; identifying information associated with the digital coin; and updating the general ledger by creating a transaction record for the digital coin, the transaction record including at least the operation and the information associated with the digital coin.

Example Ninety-Five

The non-transitory computer-readable media of Example Ninety-Four, wherein the operation comprises at least one of: a generate operation to generate one or more new digital coins that are equal in value to one or more old digital coins; a generate operation to generate one or more new digital coins that are equal in value to one or more financial instruments; a delete operation to delete the digital coin; a merge operation to merge one or more digital coins into the digital coin that is equal in value to the one or more digital coins; or a split operation to split the digital coin into one or more digital coins that are equal in value to the digital coin.

Example Ninety-Six

The non-transitory computer-readable media of Example Ninety-Four, wherein the general ledger comprises a first general ledger, the method further comprising synchronizing the transaction record with a second general ledger.

Example Ninety-Seven

The non-transitory computer-readable media of Example Ninety-Four, wherein the digital coin comprises a destination digital coin, and wherein the transaction record further includes information associated with a source digital coin.

Example Ninety-Eight

The non-transitory computer-readable media of Example Ninety-Four, wherein the information associated with the digital coin comprises a signature of the digital coin.

Example Ninety-Nine

The non-transitory computer-readable media of Example Ninety-Eight, wherein the signature comprises an encrypted one way hash of the information associated with the digital coin.

Example One Hundred

The non-transitory computer-readable media of Example Ninety-Four, wherein the transaction record further includes an identifier of an issuing trust.

Example One Hundred-One

A system comprising: one or more processors; memory; and one or more modules stored in the memory and executable by the one or more processors to perform operations comprising: identifying a general ledger; identifying an operation for a transaction associated with a digital coin; identifying information associated with the digital coin; and updating the general ledger by creating a transaction record for the digital coin, the transaction record including at least the operation and the information associated with the digital coin.

Example One Hundred-Two

The system of Example One Hundred-One, wherein the operation comprises at least one of: a generate operation to generate one or more new digital coins that are equal in value to one or more old digital coins; a generate operation to generate one or more new digital coins that are equal in value to one or more financial instruments; a delete operation to delete the digital coin; a merge operation to merge one or more digital coins into the digital coin that is equal in value to the one or more digital coins; or a split operation to split the digital coin into one or more digital coins that are equal in value to the digital coin.

Example One Hundred-Three

The system of Example One Hundred-One, wherein the general ledger comprises a first general ledger, the method further comprising synchronizing the transaction record with a second general ledger.

Example One Hundred-Four

The system of Example One Hundred-One, wherein the digital coin comprises a destination digital coin, and wherein the transaction record further includes information associated with a source digital coin.

Example One Hundred-Five

The system of Example One Hundred-One, wherein the information associated with the digital coin comprises a signature of the digital coin.

Example One Hundred-Six

The system of Example One Hundred-Five, wherein the signature comprises an encrypted one way hash of the information associated with the digital coin.

Example One Hundred-Seven

The system of Example One Hundred-One, wherein the transaction record further includes an identifier of an issuing trust.

Example One Hundred-Eight

A method comprising: identifying, by a computing device, an issuing trust; sending, by the computing device and to the issuing trust, a request to split a first digital coin into multiple digital coins, the request including an identifier of the first digital coin; and receiving, by the computing device and from the issuing trust, a second digital coin and a third digital coin that total a value that is equal to the first digital coin.

Example One Hundred-Nine

The method of Example One Hundred-Eight, further comprising storing the second digital coin and the third digital coin in storage of a trusted component of a digital wallet of the computing device.

Example One Hundred-Ten

The method of Example One Hundred-Eight, wherein the identifier of the first digital coin comprises at least one of a public key associated with the first digital coin, or a one way hash of the public key.

Example One Hundred-Eleven

The method of Example One Hundred-Eight, wherein the computing device comprises a mobile computing device.

Example One Hundred-Twelve

The method of Example One Hundred-Eight, wherein the second digital coin and the third digital coin are in a different unit of currency than a unit of currency of the first digital coin.

Example One Hundred-Thirteen

One or more non-transitory computer-readable media storing computer-executable instructions that, when executed on one or more processors, perform operations comprising: identifying an issuing trust; sending, to the issuing trust, a request to split a first digital coin into multiple digital coins, the request including an identifier of the first digital coin; and receiving, from the issuing trust, a second digital coin and a third digital coin that total a value that is equal to the first digital coin.

Example One Hundred-Fourteen

The non-transitory computer-readable media of Example One Hundred-Thirteen, the operations further comprising storing the second digital coin and the third digital coin in storage of a trusted component of a digital wallet of the computing device.

Example One Hundred-Fifteen

The non-transitory computer-readable media of Example One Hundred-Thirteen, wherein the identifier of the first digital coin comprises at least one of a public key associated with the first digital coin, or a one way hash of the public key.

Example One Hundred-Sixteen

The non-transitory computer-readable media of Example One Hundred-Thirteen, wherein the second digital coin and the third digital coin are in a different unit of currency than a unit of currency of the first digital coin.

Example One Hundred-Seventeen

A system comprising: one or more processors; memory; and one or more modules stored in the memory and executable by the one or more processors to perform operations comprising: identifying an issuing trust; sending, to the issuing trust, a request to split a first digital coin into multiple digital coins, the request including an identifier of the first digital coin; and receiving, from the issuing trust, a second digital coin and a third digital coin that total a value that is equal to the first digital coin.

Example One Hundred-Eighteen

The system of Example One Hundred-Seventeen, the operations further comprising storing the second digital coin and the third digital coin in storage of a trusted component of a digital wallet of the computing device.

Example One Hundred-Nineteen

The system of Example One Hundred-Seventeen, wherein the identifier of the first digital coin comprises at least one of a public key associated with the first digital coin, or a one way hash of the public key.

Example One Hundred-Twenty

The system of Example One Hundred-Seventeen, wherein the second digital coin and the third digital coin are in a different unit of currency than a unit of currency of the first digital coin.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method implemented by a network of computers, each with one or more processors and memory, the method comprising:

receiving, by one or more processors of a first computing device, directly or indirectly from a second computing device over a network medium, an identifier of a first digital coin, wherein the first computing device is associated with a first digital wallet that includes a user component and a trusted component, wherein the trusted component of the first digital wallet is maintained within a shell application that provides separation of code running in the trusted component from other code running in the user component of the first digital wallet, and wherein the second computing device is associated with a second digital wallet;

identifying, by the trusted component executing on the one or more processors of the first computing device, a first issuing trust of the first digital wallet;

establishing, by the trusted component executing on the one or more processors of the first computing device, a secure encrypted channel between the trusted component and a wallet service application of the first issuing trust;

sending, by the trusted component executing on the one or more processors of the first computing device, and over the secure encrypted channel, the identifier of the first digital coin to the wallet service application of the first issuing trust;

identifying, by the wallet service application executing on one or more processors of a computing system of the first issuing trust, a general ledger;

determining, by the wallet service application executing on the one or more processors of the computing system of the first issuing trust, whether the first digital coin is active in the general ledger;

in response to determining that the first digital coin is active in the general ledger, identifying, by the wallet service application executing on the one or more processors of the computing system of the first issuing trust, a second issuing trust of the second digital wallet;

sending, by the wallet service application executing on the one or more processors of the computing system of the first issuing trust, the identifier of the first digital coin to a wallet service application of the second issuing trust;

confirming, by the wallet service application executing on one or more processors of a computing system of the second issuing trust, that the first digital wallet is an intended recipient of the first digital coin;

creating, by the wallet service application executing on the one or more processors of the computing system of the second issuing trust, a first record in the general ledger to lock the first digital coin, the first record including a transfer operation and the identifier of the first digital coin;

generating, by the wallet service application executing on the one or more processors of the computing system of the first issuing trust, a second digital coin that is equal in value to the first digital coin;

updating, by the wallet service application executing on the one or more processors of the computing system of the first issuing trust, the general ledger by creating a second record in the general ledger, the second record including a generate operation, the identifier of the first digital coin, and an identifier of the second coin, wherein creation of the second record in the general ledger causes the first digital coin to no longer be usable by the second digital wallet, and further causes the second digital coin to become available for use by the first digital wallet;

sending, by the wallet service application executing on the one or more processors of the computing system of the first issuing trust, the identifier of the second digital coin to the trusted component;

receiving, by the trusted component executing on the one or more processors of the first computing device, and from the wallet service application of the first issuing trust, the identifier of the second digital coin;

storing, by the first digital wallet executing on the one or more processors of the first computing device, the second digital coin in storage of the trusted component; and updating, by the trusted component executing on the one or more processors of the first computing device, an internal ledger of the user component of the first digital wallet with an entry for the second digital coin.

2. The method of claim 1, wherein the first computing device is a server computing device, and wherein the shell application is maintained in the server computing device.

3. The method of claim 1, wherein the shell application is created by the first issuing trust.

4. The method of claim 1, wherein the identifier of the first digital coin comprises at least one of a public key associated with the first digital coin, or a one way hash of the public key.

5. The method of claim 1, wherein the first computing device comprises a mobile computing device.

6. The method of claim 1, wherein the second digital coin is in a different unit of currency than a unit of currency of the first digital coin.

7. A system comprising:
one or more first non-transitory computer-readable media storing first computer-executable instructions that, when executed on one or more first processors of a first computing device, perform operations comprising:

receiving, directly or indirectly from a second computing device over a network medium, an identifier of a first digital coin, wherein the first computing device is associated with a first digital wallet that includes a user component and a trusted component, and wherein the trusted component of the first digital wallet is maintained within a shell application that provides separation of code running in the trusted component from other code running in the user component of the first digital wallet, and wherein the second computing device is associated with a second digital wallet;

identifying, by the trusted component, a first issuing trust of the first digital wallet;

establishing, by the trusted component, a secure encrypted channel between the trusted component and a wallet service application of the first issuing trust; and sending, by the trusted component, and over the secure encrypted channel, the identifier of the first digital coin to the wallet service application of the first issuing trust;

one or more second non-transitory computer-readable media storing second computer-executable instructions that, when executed on one or more second processors of a computing system of the first issuing trust, perform operations comprising:

identifying, by the wallet service application of the first issuing trust, a general ledger;

determining, by the wallet service application of the first issuing trust, whether the first digital coin is active in the general ledger;

in response to determining that the first digital coin is active in the general ledger, identifying, by the wallet service application of the first issuing trust, a second issuing trust of the second digital wallet; and sending, by the wallet service application of the first issuing trust, the identifier of the first digital coin to a wallet service application of the second issuing trust;

one or more third non-transitory computer-readable media storing third computer-executable instructions that, when executed on one or more third processors of a computing system of the second issuing trust, perform operations comprising:

confirming, by the wallet service application of the second issuing trust, that the first digital wallet is an intended recipient of the first digital coin; and creating, by the wallet service application of the second issuing trust, a first record in the general ledger to lock the first digital coin, the first record including a transfer operation and the identifier of the first digital coin;

wherein the second computer-executable instructions, when executed on the one or more second processors of the computing system of the first issuing trust, perform additional operations comprising:

generating, by the wallet service application of the first issuing trust, a second digital coin that is equal in value to the first digital coin;

updating, by the wallet service application of the first issuing trust, the general ledger by creating a second record in the general ledger, the second record including a generate operation, the identifier of the first digital coin, and an identifier of the second coin, wherein creation of the second record in the general ledger causes the first digital coin to no longer be usable by the second digital wallet, and further causes the second digital coin to become available for use by the first digital wallet; and sending, by the wallet service application of the first issuing trust, the identifier of the second digital coin to the trusted component;

wherein the first computer-executable instructions, when executed on the one or more first processors of the first computing device, perform additional operations comprising:

receiving, by the trusted component, and from the wallet service application of the first issuing trust, the identifier of the second digital coin;

storing, by the first digital wallet, the second digital coin in storage of the trusted component; and updating an internal ledger of the user component of the first digital wallet with an entry for the second digital coin.

8. The system of claim 7, wherein the shell application is created by the first issuing trust.

9. The system of claim 7, wherein the identifier of the first digital coin comprises at least one of a public key associated with the first digital coin, or a one-way hash of the public key.

10. The system of claim 7, wherein the second digital coin is in a different unit of currency than a unit of currency of the first digital coin.

11. A system comprising:

one or more first processors of a first computing device;

first memory, the first memory storing a first digital wallet that includes a user component and a trusted component, and wherein the trusted component of the first digital wallet is maintained within a shell application that provides separation of code running in the trusted component from other code running in the user component of the first digital wallet; and one or more first modules stored in the first memory and executable by the one or more first processors to perform operations comprising:

receiving, directly or indirectly from a second computing device of a payer over a network medium, an identifier of a first digital coin;

identifying, by the trusted component, a first issuing trust of the first digital wallet;

establishing, by the trusted component, a secure encrypted channel between the trusted component and a wallet service application of the first issuing trust; and sending, by the trusted component, and over the secure encrypted channel, the identifier of the first digital coin to the wallet service application of the first issuing trust;

one or more second processors of a computing system of the first issuing trust;

second memory; and one or more second modules stored in the second memory and executable by the one or more second processors to perform operations comprising:

identifying, by the wallet service application of the first issuing trust, a general ledger;

determining, by the wallet service application of the first issuing trust, whether the first digital coin is active in the general ledger;

in response to determining that the first digital coin is active in the general ledger, identifying, by the wallet service application of the first issuing trust, a second issuing trust of the second digital wallet; and sending, by the wallet service application of the first issuing trust, the identifier of the first digital coin to a wallet service application of the second issuing trust;

one or more third processors of a computing system of the second issuing trust;

third memory; and one or more third modules stored in the third memory and executable by the one or more third processors to perform operations comprising:

confirming, by the wallet service application of the second issuing trust, that the first digital wallet is an intended recipient of the first digital coin; and creating, by the wallet service application of the second issuing trust, a first record in the general ledger to lock the first digital coin, the first record including a transfer operation and the identifier of the first digital coin;

wherein the one or more second modules are further executable by the one or more second processors of the computing system of the first issuing trust to perform additional operations comprising:

generating, by the wallet service application of the first issuing trust, a second digital coin that is equal in value to the first digital coin;

updating, by the wallet service application of the first issuing trust, the general ledger by creating a second record in the general ledger, the second record including a generate operation, the identifier of the first digital coin, and an identifier of the second coin, wherein creation of the second record in the general ledger causes the first digital coin to no longer be usable by the second digital wallet, and further causes the second digital coin to become available for use by the first digital wallet; and sending, by the wallet service application of the first issuing trust, the identifier of the second digital coin to the trusted component;

wherein the one or more first modules are further executable by the one or more first processors of the first computing device to perform additional operations comprising:

receiving, by the trusted component, and from the wallet service application of the first issuing trust, the identifier of the second digital coin;

storing, by the first digital wallet, the second digital coin in storage of the trusted component; and updating an internal ledger of the user component of the first digital wallet with an entry for the second digital coin.

12. The system of claim 11, wherein the one or more first processors and the first memory reside in a server computing device, and wherein the shell application is maintained in the first memory of the server computing device.

13. The system of claim 11, wherein the shell application is created by the first issuing trust.

14. The system of claim 11, wherein the identifier of the first digital coin comprises at least one of a public key associated with the first digital coin, or a one way hash of the public key.

15. The system of claim 11, wherein the one or more first processors and the first memory reside in a mobile computing device.

16. The system of claim 11, wherein the second digital coin is in a different unit of currency than a unit of currency of the first digital coin.

17. The system of claim 11, wherein the one or more first modules are further executable by the one or more first processors of the first computing device to perform additional operations comprising sending, directly or indirectly to the second computing device of the payer over the network medium, an acknowledgement.

18. The method of claim 1, further comprising sending, by the first computing device, directly or indirectly to the second computing device over the network medium, an acknowledgement.

19. The system of claim 7, wherein the first computer-executable instructions, when executed on the one or more first processors of the first computing device, perform additional operations comprising sending, directly or indirectly to the second computing device over the network medium, an acknowledgement.

* * * * *